(12) United States Patent
Nakayama et al.

(10) Patent No.: US 7,551,203 B2
(45) Date of Patent: Jun. 23, 2009

(54) PICTURE INPUTTING APPARATUS USING HIGH-RESOLUTION IMAGE PICKUP DEVICE TO ACQUIRE LOW-RESOLUTION WHOLE PICTURES AND HIGH-RESOLUTION PARTIAL PICTURES

(75) Inventors: Osafumi Nakayama, Kawasaki (JP); Morito Shiohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1075 days.

(21) Appl. No.: 10/722,586

(22) Filed: Nov. 28, 2003

(65) Prior Publication Data

US 2004/0141067 A1 Jul. 22, 2004

(30) Foreign Application Priority Data

Nov. 29, 2002 (JP) ............................. 2002-347301

(51) Int. Cl.
H04N 5/228 (2006.01)
H04N 5/225 (2006.01)
H04N 5/235 (2006.01)

(52) U.S. Cl. ............. 348/222.1; 348/220.1; 348/208.14

(58) Field of Classification Search ......... 348/169–172, 348/208.14, 222.1, 294–324, 220.1
See application file for complete search history.

(56) References Cited

U.S. PATENT DOCUMENTS

| | | | | |
|---|---|---|---|---|
| 4,800,288 A | * | 1/1989 | Inagaki et al. | 348/300 |
| 4,888,795 A | * | 12/1989 | Ando et al. | 348/14.14 |
| 5,003,264 A | * | 3/1991 | Koizumi et al. | 324/309 |
| 5,058,190 A | * | 10/1991 | Levitt et al. | 382/324 |
| 5,262,871 A | * | 11/1993 | Wilder et al. | 348/307 |
| 5,323,987 A | * | 6/1994 | Pinson | 244/3.16 |
| 5,642,168 A | * | 6/1997 | Masaki | 348/441 |
| 5,644,386 A | * | 7/1997 | Jenkins et al. | 356/4.01 |
| 6,084,939 A | * | 7/2000 | Tamura | 378/98.2 |
| 6,130,710 A | * | 10/2000 | Yasuda | 348/220.1 |
| 6,204,879 B1 | * | 3/2001 | Koseki et al. | 348/230.1 |
| 6,512,858 B2 | * | 1/2003 | Lyon et al. | 382/305 |

(Continued)

FOREIGN PATENT DOCUMENTS

JP  9-214836  8/1997

(Continued)

*Primary Examiner*—David L Ometz
*Assistant Examiner*—Richard M Bemben
(74) *Attorney, Agent, or Firm*—Staas & Halsey LLP

(57) ABSTRACT

A solid state image pickup device has a high-resolution pixel array consisting of a plurality of photo-receptive elements disposed at a high density. A low-resolution whole picture scanning unit outputs low-resolution whole picture data by reading out and scanning the wholeness with the resolution of the pixel array lowered. A high-resolution partial picture scanning unit outputs high-resolution partial picture data by partial readout and scanning with high-resolution of the pixel array kept. A switching unit provides a switching between the low-resolution whole picture scanning unit and the high-resolution partial picture scanning unit within a frame period to thereby output in sequence the low-resolution whole picture data and the high-resolution partial image data at a speed equal to or greater than the video rate. A picture extraction processing unit automatically determines the extracting position of a high-resolution partial picture at the next frame, based on the low-resolution whole picture data, to thereby instruct the high-resolution partial picture scanning unit on the extracting position.

10 Claims, 24 Drawing Sheets

U.S. PATENT DOCUMENTS

| | | | |
|---|---|---|---|
| 6,839,452 B1 * | 1/2005 | Yang et al. | 382/103 |
| 7,061,526 B2 | 6/2006 | Nakayama et al. | |
| 7,106,374 B1 * | 9/2006 | Bandera et al. | 348/308 |
| 7,110,023 B2 * | 9/2006 | Utsumi et al. | 348/208.14 |
| 7,162,101 B2 * | 1/2007 | Itokawa et al. | 382/282 |
| 7,408,572 B2 * | 8/2008 | Baxter et al. | 348/208.14 |

FOREIGN PATENT DOCUMENTS

| | | |
|---|---|---|
| JP | 2000-32318 | 1/2000 |
| JP | 2002-335435 | 11/2002 |

* cited by examiner

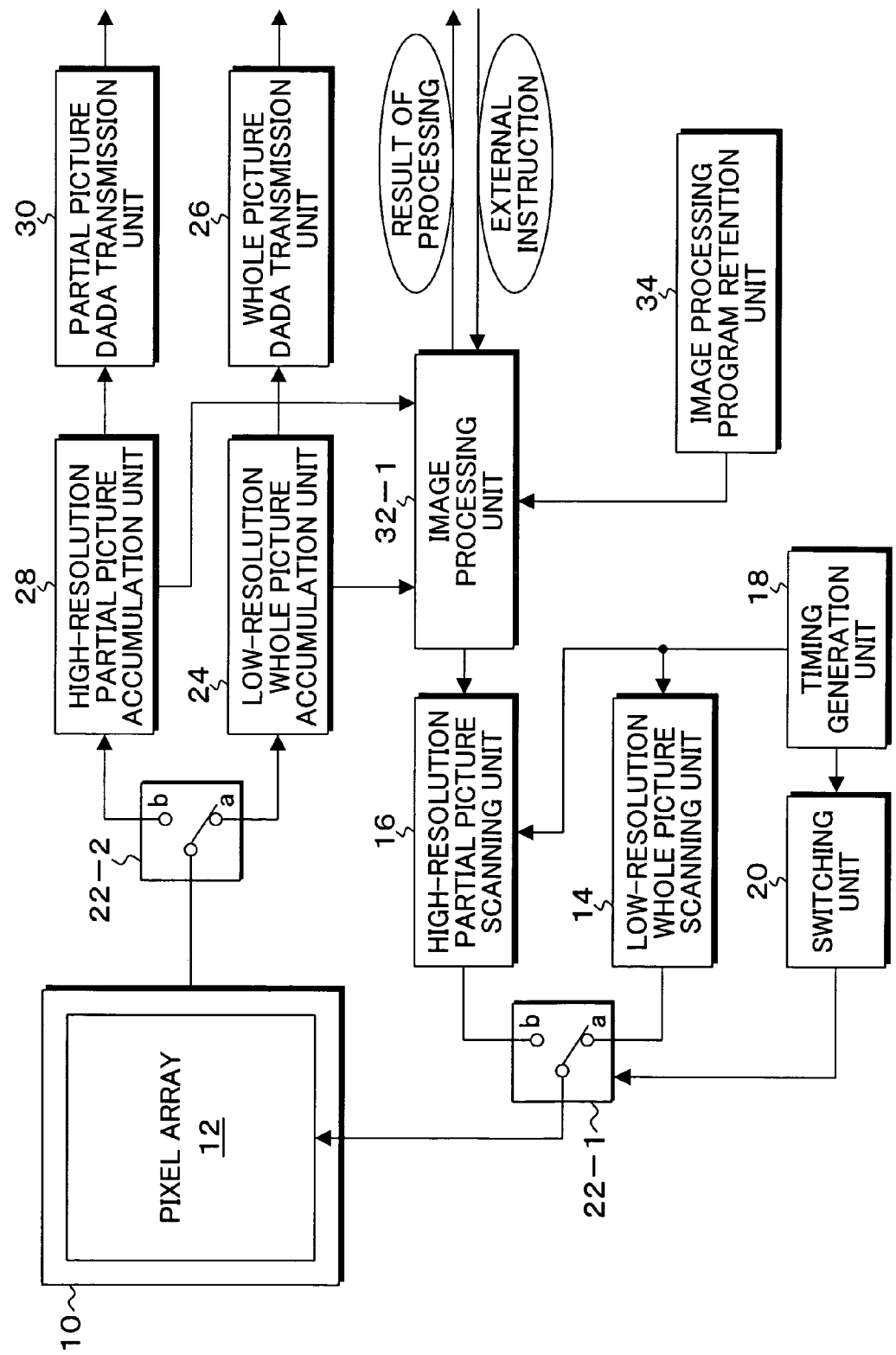

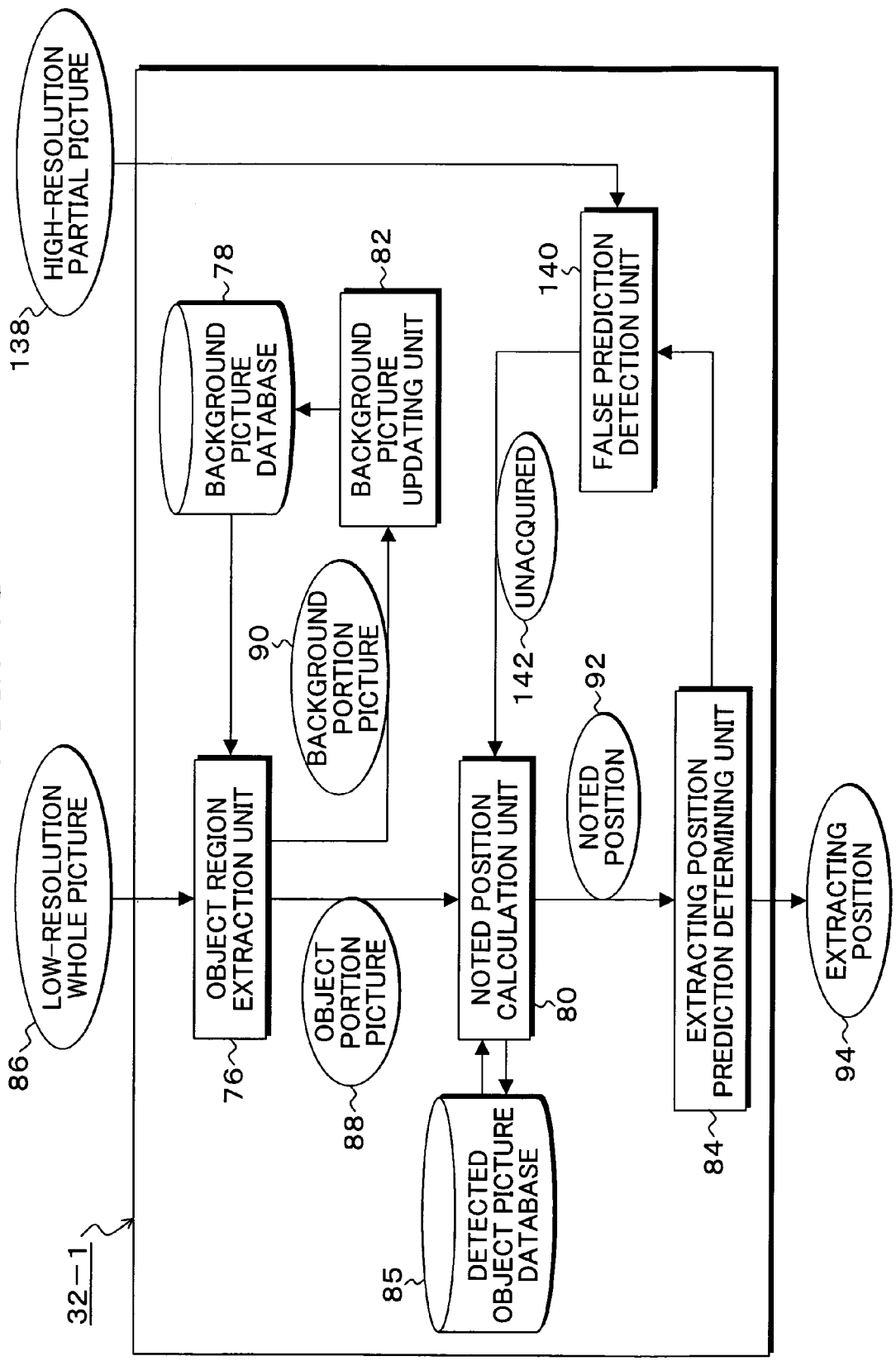

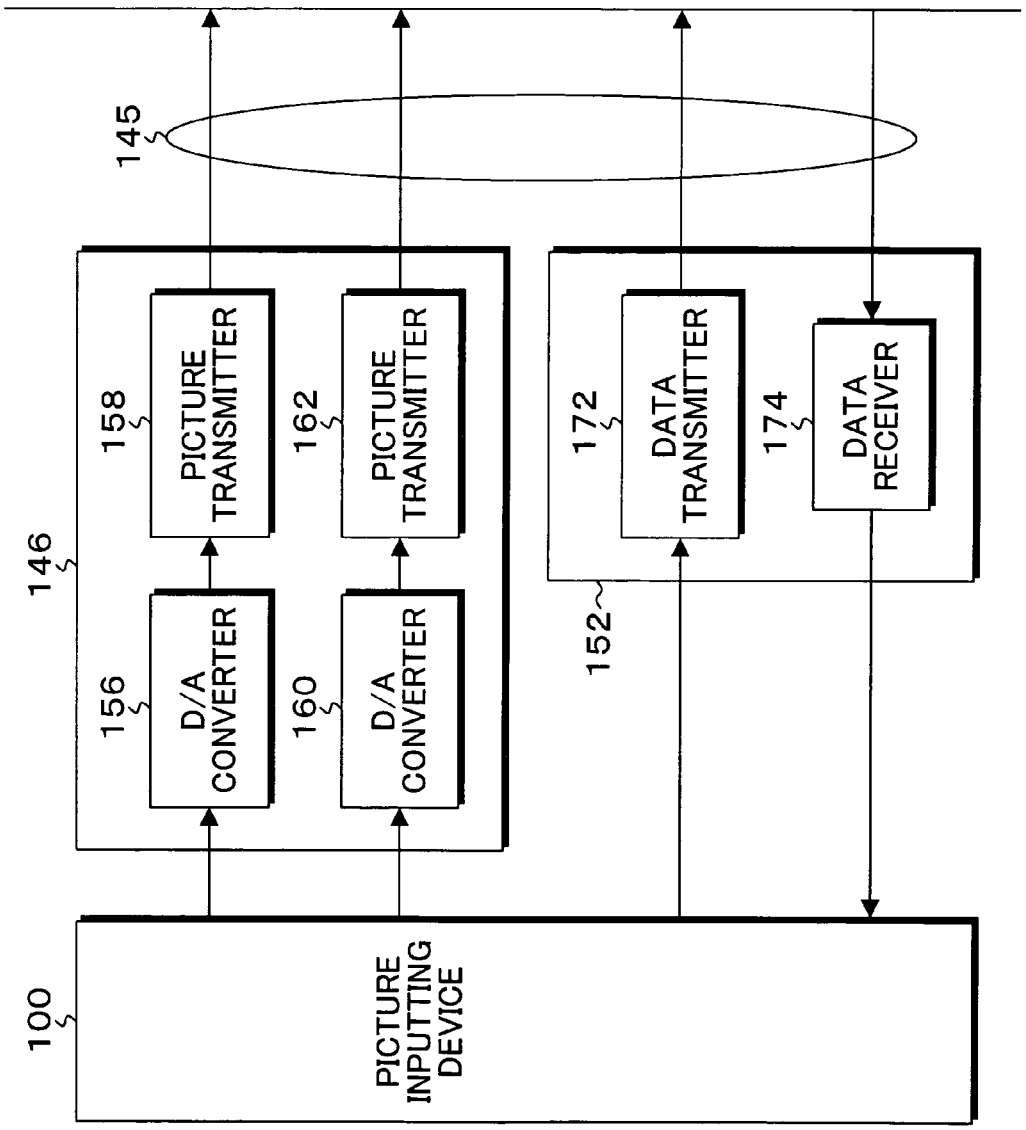

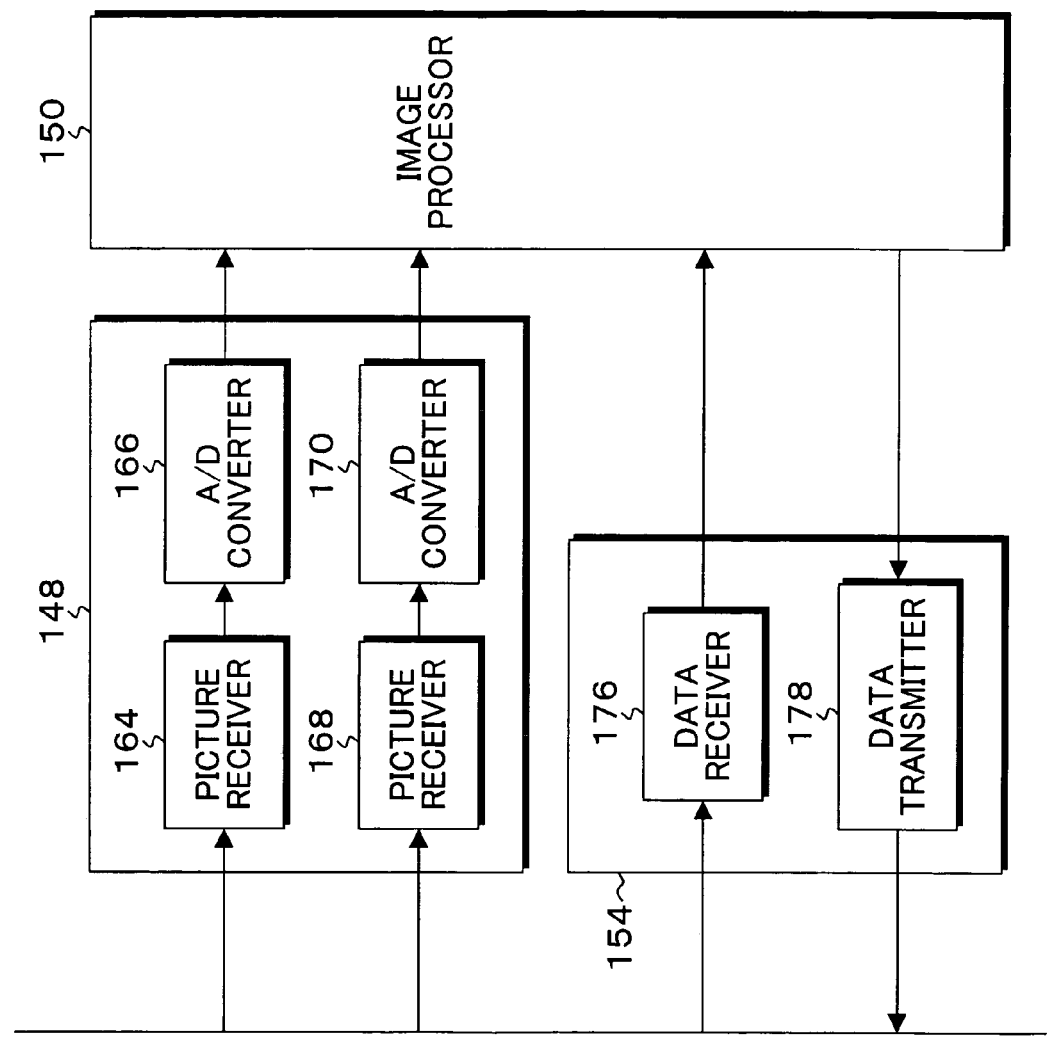

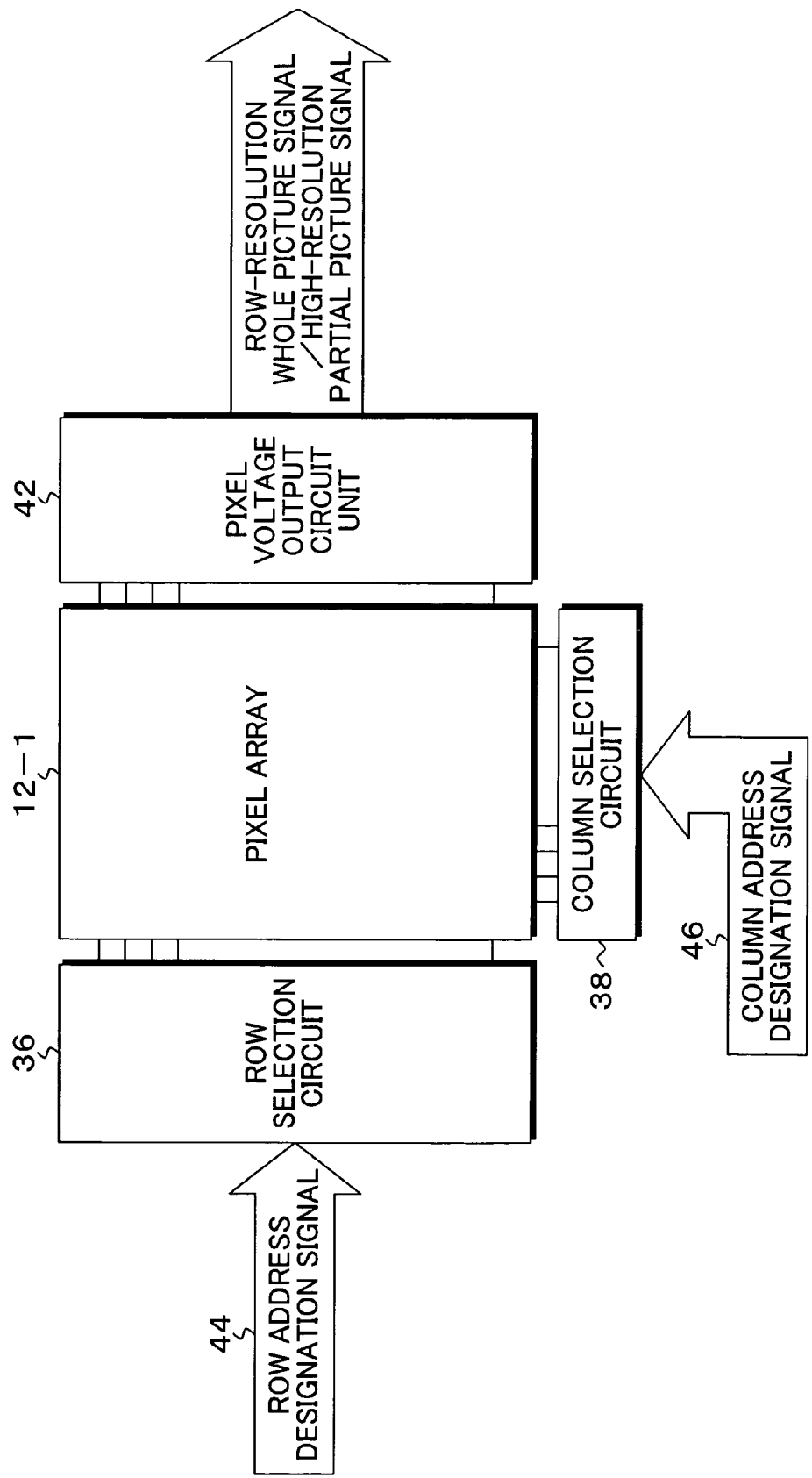

PICTURE INPUTTING APPARATUS USING HIGH-RESOLUTION IMAGE PICKUP DEVICE TO ACQUIRE LOW-RESOLUTION WHOLE PICTURES AND HIGH-RESOLUTION PARTIAL PICTURES

BACKGROUND OF THE INVENTION

1. Field of the Invention

The present invention relates generally to a picture inputting apparatus for use in picture input to an animation processing system, etc., and more particularly to an image inputting apparatus using a high-resolution solid state image pickup device to acquire low-resolution whole pictures and high-resolution partial pictures.

2. Description of the Related Art

Up until now, in order to acquire detailed picture information while securing a wide range of observation range, picture inputting apparatuses have employed a method in which the resolutions are uniformly improved by raising the mounting density of image pickup devices such as CCD image pickup devices or CMOS image pickup devices. The raised resolutions of the image pickup devices lead to securement of sufficient resolutions and to acquisition of detailed contents for a relatively small target as well even though a wide-angle optical lens is used to shoot a wider area.

However, such a uniform raise of the resolutions of the image pickup devices has disadvantageously resulted in enormous amount of information possessed by the pictures and in a lot of time required to transmit the pictures since limitation is imposed on the capacities of the transmission path for transmitting the pictures and on the input capacities of the apparatuses for inputting pictures into the image processor or a display unit, thus leading to an extreme lowering of the frame rate by which pictures can be obtained.

When using an image pickup device of e.g., 3000000 pixels of 1700×1700 pixels in length and width, the frame rate to be acquired is of the order of 8 fps (frames per second). For this reason, if a high-resolution image pickup device is used for image pickup when the target is moving, it has been difficult to follow a target whose position varies with time and to use it as the image inputting apparatus of the time-varying image processing system.

Proposed as the prior art for preventing such a lowering of the frame rate is a method for realizing the simultaneous acquisition of the whole observation and the partial detailed pictures while suppressing the total amount of information, by acquiring, for the whole picture of the target to be shot, pictures with reduced pixels through the lowering of the resolution and simultaneously by acquiring, for only a part of the wholeness, detailed pictures without increasing the pixel count through the shooting of high-resolution pictures without lowering the resolution.

To realize this, there are roughly two approaches, first is an approach using a device, and second is an approach using a plurality of image pickup sensors. The former is a method as proposed in Japanese Patent Laid-open (kokai) Pub. No. H9-214836. For shooting of the wholeness of the target, a high-resolution image pickup device is used which consists of a plurality of photo-receptive cells (photo-receptive pixels) which are arranged at a high density, and the obtained high-resolution pictures are thinned out for accumulation into a memory in the form of a low-resolution whole picture. On the contrary, for only a part of the whole picture, the original high-density picture information is extracted to accumulate it as a detailed picture into another memory, with the two pictures being extracted switchingly every one frame or for each more than one frames such that the two pictures accumulated in their respective memories are synthesized into a single picture, which in turn is output in NTSC format so that the picture can be monitored by the NTSC television monitor.

For the camera system using a high-resolution image pickup device, Japanese Patent Laid-open (kokai) Pub. No. 2000-32318 proposes a method for simultaneously acquiring a whole picture for field angle registration and a partial detailed picture for auto-focusing, for a picture within the same frame. The summary of the realization mean is as follows.

Each row of one frame picture is scanned in sequence. The rows required for only the low-resolution picture of the whole picture are subjected to thinning-out processing for each row and, for the rows requiring it, the results of execution of the thinning-out processing on the pixel columns within the rows are accumulated in a memory for thinned-out pictures.

In the rows to acquire a detailed picture, information on all pixels within the row is accumulated in another memory for detailed pictures without performing the thinning out processing. The thinning out processing in the row and column directions are effected on the partial pictures unsubjected to the thinning out processing accumulated in the memory for detailed pictures, to synthesize the obtained thinned-out low-resolution pictures of the partial pictures and the low-resolution pictures of remaining portions obtained in the previous stage and accumulated in the memory for thinned-out pictures, to thereby output a low-resolution whole picture.

As to the partial pictures lying in the memory for detailed pictures, original high-resolution pictures for the wholeness of the row are accumulated, and hence portions required as the detailed pictures are extracted for the output as the partial detailed pictures.

The methods proposed in the Patent Documents 1 and 2 allows suppression of the amount of information to be transferred as well as securement of the picture frame rate since the picture size of the whole picture and of the detailed pictures is sufficiently small in terms of the total resolution.

The inventors of the present application have proposed the following as the method using a plurality of image pickup sensors (Japanese Patent Application No. 2001-140925). This method obtains partial detailed pictures by dividing a target projected image into two images by a bisecting optical system, reducing the wholeness of one image using a reducing optical system to allow a single image pickup device to shoot a whole picture, and shooting a part of the other image enlarged by an enlarging optical system using another image pickup device.

The above method is characterized in that at that time, the position to shoot a partial image can move to any position in the whole picture by attaching the image pickup device onto a mechanism capable of varying the position on a plane such as an XY stage. According to this method, it is possible to equivalently obtain 100 times higher resolution by shooting partial pictures among images whose sides are enlarged to 10 times. In addition, it is possible to restrict the amount of information to the doubled VGA amount of information at most by setting the size of the image pickup device shooting the whole picture and the detailed pictures to the size, e.g., of the order of VGA (640×480 pixels).

However, the methods of Patent Documents 1 and 2 have been effected for the purpose of allowing a person to simply perform the field angle adjustment and focusing adjustment in the camera shooting system. The above methods are arranged such that output is made so that synthesized pictures of the whole picture for field angle adjustment and the partial detailed pictures for focusing adjustment appear at the same time in order to allow the person to perform visual adjustments by the NTSC television monitor or such that auto-focusing adjustment is made by detailed pictures of a certain portion while allowing the person to visually observe the whole picture at all times through the NTSC television monitor.

To this end, in the method of Japanese Patent Laid-open (kokai) Pub. No. H9-214836, the whole picture and the partial detailed pictures are embedded in a single NTSC picture (whose resolution is of the order of 512×480 pixels in length and width), and hence the resolutions possessed by the respective pictures become halved. Thus, it is essential for a person to intervene since the portions to be image picked up as detailed pictures must be predefined fixed portions or must be directly designated from the outside of the apparatus due to the lowered amount of information as well as due to independent outputs of the whole picture and the partial detailed pictures.

In the method of Japanese Patent Laid-open (kokai) Pub. No. 2000-32318, the low-resolution picture of the whole scene is merely converted by D/A conversion into analog television signals such as NTSC and is output for field angle verifications, whereas the partial detailed pictures are not output to the outside which are merely used within the interior of the apparatus for auto adjustment of the focus distance. Moreover, the acquiring positions of the partial detailed pictures are predetermined positions or portions designated by a person from the outside of the apparatus.

In case of considering it as a picture inputting apparatus in the time-varying image processing system, it is necessary to input picture information which is sole input information as much as possible, i.e., to input detailed picture information in terms of the stabilization of the processing and a higher function. In view of this point, it is impossible for the camera system which outputs the whole picture and the partial detailed pictures as a single picture to implement desired performances due to its lowered amount of information.

The time-varying image processing system treats scenes which move (vary) with time as processing targets and the required information also varies with time, whereupon it is necessary to automatically set points at which the detailed information is acquired, depending on the contents appearing in the scene which varies with time.

In the conventional apparatuses of Patent Documents 1 and 2, however, the positions to acquire the detailed pictures must manually be designated from the outside of the apparatus. Since the apparatuses do not have any function for varying the position to acquire the detailed pictures depending on the picture information, it would be difficult to meet the requirements for the time-varying image processing system.

Otherwise, the conventional apparatuses suffer another problem on means for creating the whole low-resolution pictures. The conventional apparatuses create the low-resolution picture by merely thinning out the high-resolution pictures. If pixels are thinned out such that the dimensions of the low-resolution picture becomes 1/N of the dimensions of the original high-resolution pictures, the input picture information results in having a N-times higher frequency than the sampling rate since the frequency band possessed by the pictures is unvaried in spite of lowering of the picture sampling frequency to 1/N.

For this reason, aliasing occur at high-frequency portions due to the sampling theorem, resulting in false pictures. If false information is included in the pictures input to the time-varying image processing system, the system may experience mis-recognition and thus abnormal actions. Since such aliasing-based false information cannot be removed in the latter processings, it is inevitable to remove the false information at the stage of conversion into the low-resolution pictures.

In Japanese Patent Application No. 2001-140925, the image pickup device obtaining partial high-resolution picture is moved through mechanical operations by use of, e.g., an XY stage. Due to the weight of the drive of the stage and to the weight of the image pickup device itself, however, it is difficult to keep a high moving speed enough to move from end to end of the picture within the frame rate (e.g., 1/30 sec), and consequently, to acquire detailed pictures at quite different points for each frame rate.

If N frames are required to complete the shooting of any point, when the target is an object which moves at a high speed, the position of the target will offset from the position designated to acquire a detailed picture due to the movement of the target during N frames. It is thus difficult to catch the target needing the detailed picture at the center of the detailed picture, and disadvantageously in case of particularly high speed, the target may possibly deviate from the detailed picture. There arises also a problem that it is impossible to shoot, while varying the shooting positions on a frame rate basis, targets to be shot scattering in a shooting range.

SUMMARY OF THE INVENTION

It is therefore the object of the present invention to provide a picture inputting apparatus capable of acquiring a low-resolution whole picture and high-resolution partial pictures at one time and at a high speed.

FIG. 1 is a diagram illustrating the principle of the present invention. The present invention provides a picture inputting apparatus comprising a solid state image pickup device having a high-resolution pixel array consisting of a plurality of photo-receptive elements disposed at a high density for converting a formed image into a pixel value of an electric signal by photoelectric conversion; a low-resolution whole picture scanning unit which outputs low-resolution whole picture data by reading out and scanning the wholeness of an imaging range with the resolution of the pixel array lowered; a high-resolution partial picture scanning unit which outputs high-resolution partial picture data by partially reading out and scanning the imaging range with high-resolution of the pixel array kept; a switching unit which provides a switching between the low-resolution whole picture scanning unit and the high-resolution partial picture scanning unit within a predetermined frame period to thereby output in sequence the low-resolution whole picture data and the high-resolution partial image data at a speed equal to or greater than the video rate (30 fps); and an image processing unit which automatically determines the extracting position of the high-resolution partial picture at the next frame, based on the low-resolution whole picture data output from the low-resolution whole picture scanning unit, to thereby instruct the high-resolution partial picture scanning unit on the extracting position.

Thus, according to the present invention, the whole scene is acquired as a low-resolution picture and only the partial noted points are acquired as detailed pictures, with the result that even though an extremely high resolution is used for the detailed pictures, when the two pictures have the same size, it is possible to restrict the absolute amount of information of the two pictures to the amount for the two pictures at most and to acquire the whole picture and the detailed pictures at one time and rapidly at a frame rate equal to or greater than the video rate.

When a wide range of scene is shot by a television camera having an ordinary NTSC (512×480 pixels) size or VGA (640×480 pixels) size for example, detailed information may not be obtained due to the collapsed picture arising from the insufficient resolution. However, use of the present invention makes it possible through the use of the high-resolution image pickup device to obtain detailed picture information without the pictures becoming collapsed since the points requiring detained information are shot with high resolution kept whereas the whole image is shot with the resolution lowered such as for example NTSC 512×480 pixels or VGA 640×480 pixels.

In addition, by providing the whole picture with a low-resolution and by restricting the picture region of the detailed picture to a certain portion, it is possible to suppress the size (the amount of information) of the two pictures themselves and to restrain the imaging rate of the pictures from lowering due to the excessive amount of information to thereby obtain the pictures at a speed rate equal to or greater than the video rate.

The image processing unit included in the apparatus allows portions whose detailed pictures are to be acquired to automatically and rapidly be selected depending on the contents of the whole picture.

At that time, the acquiring position of the detailed picture is varied through electrical control of the readout position of the pixel array without needing any mechanical operations, and the time required for the change of the acquiring position is defined by longer one, between the time required for the processing determining the shooting position of the detailed picture at the next frame which is performed in the image processing unit, and the time period (frame rate) taken to shoot the next frame.

Thus, by restricting the processing performed by the image processing unit to the frame rate or less, the points of the detailed picture to be shot at the next frame can be determined within the current frame, thus enabling quite different positions to be shot for each frame.

The present invention enables optimum pictures to be input to the time-varying image processing system. The time-varying image processing system has contradictory requirements such as requiring detailed pictures (information) of a target object if it exists while observing at all time a wide shooting range within which a relatively small target object moving therethrough lies, requiring the acquisition of the detailed pictures following the movement of the object since the moving object is a target, and further needing to change with time the acquiring positions of the detailed pictures while shooting the object with a picture shooting rate equal to or greater than the video rate. The present invention is however applicable to such time-varying image processing system in general.

The present invention may be applied also as an image inputting apparatus which includes a high-level of pre-processing in which the low-resolution whole picture and the high-resolution partial picture are treated as input information for the different image processing system which follows.

Examples of such an image processing system can include a physical distribution management system for managing the deliveries by reading characters described on a small piece of seal adhered to the object with high-resolution partial pictures while monitoring the objects flowing on the conveyor with the low-resolution whole picture, and a monitoring system for accumulating or image identifying the detailed pictures of an invader obtained as high-resolution partial pictures while monitoring the presence or absence of the invader into the region, to thereby issue a proper warning depending on the target.

Otherwise, the present invention is applicable also to a picture inputting apparatus for use with an ultra-high-resolution still image camera which obtains high-resolution partial pictures at respective positions of the whole shooting range and synthesizes those pictures to create an ultra-high-resolution picture of the whole shooting range.

The picture inputting apparatus of the present invention further comprises a low-resolution whole picture accumulation unit which accumulates the low-resolution whole picture data output as a result of readout scanning of the pixel array; a whole picture data transmission unit which reads out images accumulated in the low-resolution whole picture accumulation unit to shape the low-resolution whole picture data into a single piece of picture data in a predetermined format (NTSC, VGA, etc.,), for the output to the outside; a high-resolution partial picture accumulation unit 24 which accumulates the high-resolution partial picture data output as a result of the readout scanning of the pixel array; and a partial picture data transmission unit which reads out images accumulated in the high-resolution partial picture accumulation unit to shape the high-resolution partial picture data into a single piece of picture data in a predetermined format (NTSC, VGA, etc.,), for the output to the outside.

Herein, the solid state image pickup device includes a plurality of photo-receptive elements which are two-dimensionally arranged in $N_1$ rows and $N_2$ columns; a column selection line and a row selection line which select individually the plurality of photo-receptive elements to allow output of a pixel value; two output lines disposed at each of the plurality of photo-receptive elements; and a plurality of filters which calculate and output the sum or the mean value by connecting to their respective inputs one output lines of the photo-receptive elements on an $n_1$ rows and $n_2$ columns pixel basis where $n_1$ and $n_2$ are integers obtained by dividing high-resolution $N_1$ rows and $N_2$ columns by low-resolution $m_1$ rows and $m_2$ columns, respectively, where the pixel count of the $N_1$ rows and $N_2$ columns provides a high-resolution picture while the pixel count of $m_1$ rows and $m_2$ columns less than the pixel count of the $N_1$ rows and $N_2$ columns provides a low-resolution picture.

In this case, the low-resolution whole picture scanning unit collectively selects the photo-receptive elements for each $n_1$ rows and $n_2$ columns for each of the plurality of filters and simultaneously allows filter outputs of $m_1$ rows and $m_2$ columns to be output in the form of low-resolution whole picture signals, whereas the high-resolution partial picture scanning unit scans the photo-receptive elements in $k_1$ rows and $k_2$ columns which are designated as the extracting position within the $N_1$ rows and $N_2$ columns to allow pixel values to be output as high-resolution partial picture signals from the other output lines.

In this manner, the readout scanning of the low-resolution whole image is subjected for output to the local averaging processing where the pixel array is segmented into the length $n_1$×width $n_2$ pixel regions for the input into filters to obtain the sum total or the means value of the pixel values as a new pixel value, whereby it is possible to suppress aliasing in which the picture high-frequency components form false information in the low-resolution picture and to provide satisfactory pictures for the image processing.

In the present invention, the low-resolution whole picture may be created by pixel thinned-out processing. That is, the solid state image pickup device includes a plurality of photo-receptive elements which are two-dimensionally arranged in $N_1$ rows and $N_2$ columns; and a column selection line and a row selection line which select individually the plurality of photo-receptive elements to allow output of a pixel value, wherein the low-resolution whole picture scanning unit allows output of low-resolution whole picture signals while thinning out pixel values for each $n_1$ rows and $n_2$ columns where $n_1$ and $n_2$ are integers obtained respectively by dividing high-resolution $N_1$ rows and $N_2$ columns respectively by low-resolution $m_1$ rows and $m_2$ columns, where the pixel count of the $N_1$ rows and $N_2$ columns provides a high-resolution picture while the pixel count of $m_1$ rows and $m_2$ columns less than the pixel count of the $N_1$ rows and $N_2$ columns provides a low-resolution picture, and wherein the high-resolution partial picture scanning unit scans the photo-receptive elements in $k_1$ rows and $k_2$ columns which are designated as the extracting position within the $N_1$ rows and $N_2$ columns to allow pixel values to be output as high-resolution partial picture signals.

Although in this case, the thinning-out may possibly cause aliasing in the low-resolution whole image, it can be coped with by restricting its use to the observation target whose picture suffers relatively small variance and less aliasing.

The low-resolution whole picture scanning unit and the high-resolution partial picture scanning unit perform readout scanning such that the low-resolution whole picture and the high-resolution partial picture have the same pixel size. For example, the low-resolution whole picture scanning unit and the high-resolution partial picture scanning unit perform readout scanning such that the low-resolution whole picture and the high-resolution partial picture have the same pixel size which is expressed by a matrix of 512×480 pixels in NTSC, 768×576 pixels in PAL or 640×480 pixels in VGA.

In this case, even though the resolution of the high-resolution partial pictures for obtaining the detailed images is extremely high, the amount of information of two pictures is still equal to the amount of information for two frames of NTSC 512×480 pixels or VGA 640×480 pixels, thereby enabling the two pictures to be readout at one time and rapidly at a frame rate equal to or greater than the video rate of 30 fps.

Although an increased resolution does not lead to a variance in the amount of information, there is a relationship that accordingly as the resolution becomes higher, the size of the region of the high-resolution partial picture occupying in the low-resolution whole picture becomes smaller.

The image processing unit includes, as an example of the processing thereof, an object region extraction unit which extracts a changed object region and an unchanged non-object region based on the difference of pixels between low-resolution whole picture data of the current frame and background picture data of the last frame; a background picture updating unit which adds the unchanged non-object region to the background picture data, for updating; a noted position detection unit which selects an undetected noted object through the comparison of the object region data with detected object data of the last frame, to determine a noted position, the noted position detection unit adding the selected noted object to the detected object data, for updating; and an extracting position determination unit which predicts a noted position of the next frame based on a motion model obtained from the frame history of the noted position of the selected noted object, to determine a picture extracting position of the next frame.

This allows acquisition of a high-resolution picture of only the required position while automatically tracking a moving object.

The image processing unit may automatically determine the extracting position of a high-resolution picture at the next frame based on the high-resolution partial picture data in addition to the low-resolution whole picture data and instruct the high-resolution partial picture scanning unit on the determined extracting position.

More specifically, the image processing unit includes an object region extraction unit which extracts a changed object region and an unchanged non-object region based on the difference of pixels between low-resolution whole picture data of the current frame and background picture data of the last frame; a background picture updating unit which adds the unchanged non-object region to the background picture data, for updating; a prediction failure detection unit which compares high-resolution partial picture data acquired at the current frame with low-resolution whole picture data at the extracting position accumulated in the last frame, the prediction failure detection unit if the two pictures differs from each other, removing the noted object from the detected object picture of the last frame; a noted position detection unit which selects an undetected noted object through the comparison of the object region data with the detected object picture data, to determine a noted position, the noted position detection unit adding the selected object to the detected object picture data, for updating; and an extracting position determination unit which predicts a noted position of the next frame based on a motion model obtained from the frame history of the selected noted object, to determine the extracting position of the next frame.

Thus, in cases where there is no noted object in the high-resolution partial picture at the position predicted and extracted with differing from the low-resolution partial picture at the extracting position accumulated in the last frame, the noted object in the detected object image is removed so that the high-resolution partial picture of the noted object can again be acquired, to thereby recover the prediction failure.

The image processing unit determines the extracting position of a high-resolution partial picture based on the execution of an image processing program externally loaded and retained or on an external instruction.

The picture inputting apparatus of the present invention further comprises a picture transmission unit which converts into analog picture signals low-resolution whole picture data output from the low-resolution whole picture scanning unit and high-resolution partial picture data output from the high-resolution partial picture scanning unit, to transmit the obtained analog picture signals to an external image processor via a transmission path. Herein, the picture transmission unit converts the low-resolution whole picture data and the high-resolution partial picture data into analog picture signals, respectively, for parallel transmission.

Thus, by converting the low-resolution whole picture data and the high-resolution partial picture data into analog picture signals, respectively, for transmission, any processing such as image recognition can be implemented on the basis of the low-resolution whole picture and the high-resolution partial pictures through the utilization of an external image processor disposed at a remote site.

The above and other objects, aspects, features and advantages of the present invention will become more apparent from the following detailed description when taken in conjunction with the accompanying drawings.

BRIEF DESCRIPTION OF THE DRAWINGS

FIG. 17 is a block diagram of a second embodiment of the present invention using a high-brightness partial picture for picture extraction processing;

FIG. 18 is a block diagram of a functional configuration of an image processing unit of FIG. 17;

FIGS. 21A and 21B are block diagrams of a third embodiment of the present invention in which picture signals are transmitted for processing to an external image processor;

FIG. 22 is an explanatory diagram of a solid state image pickup device for use in a fourth embodiment of the present invention in which low-resolution whole pictures are generated by pixel thinned-out scanning.

DESCRIPTION OF THE PREFERRED EMBODIMENTS

Figure 1:
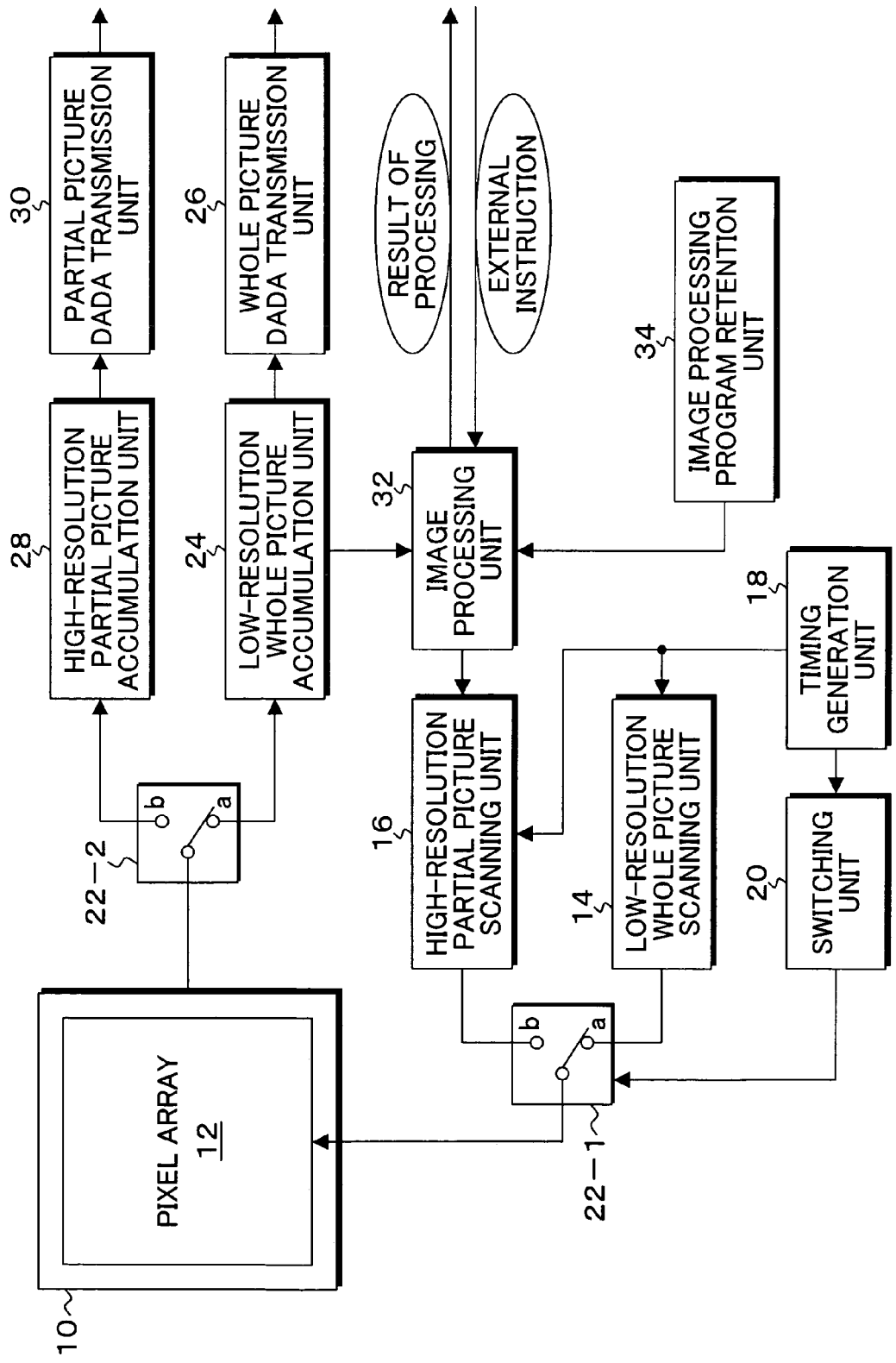
FIG. 1 is a block diagram of a first embodiment of the present invention.

FIG. 1 is a block diagram of an embodiment of an image inputting apparatus according to the present invention. In FIG. 1, the image inputting apparatus of the present invention comprises a solid state image pickup device 10 having a pixel array 12, a low-resolution whole picture scanning unit 14, a high-resolution partial picture scanning unit 16, a timing generation unit 18, a switching unit 20, switches 22-1, 22-2, low-resolution whole picture accommodation unit 24, a whole picture data transmission unit 26, a high-resolution partial picture accumulation unit 28, a partial picture data transmission unit 30, a picture extraction processing unit 32, and an image processing program retention unit 34.

The pixel array 12 of the solid state image pickup device 10 consists of a plurality of photo-receptive elements (photo-receptive cells) capable of obtaining high resolutions which are two-dimensionally arranged at a high density and serves to convert an image formed via an optical system into a pixel value of an electric signal through photoelectric conversion of the photo-receptive elements.

At the timing when the switches 22-1 and 22-2 are switched to the shown position a by the switching unit 20, the low-resolution whole picture scanning unit 14 outputs, based on a timing clock from the timing generation unit 18, low-resolution whole picture data to the low-resolution whole picture accumulation unit 24 which uses an accumulation memory, for accumulation, through readout scanning of the overall shooting range with reduced resolution in the pixel array 12.

At the timing when the switches 22-1 and 22-2 are switched to the shown position b by the switching unit 20, the high-resolution partial picture scanning unit 16 outputs, based on a timing clock from the timing generation unit 18, high-resolution partial picture data to the high-resolution partial picture accumulation unit 28 which uses an accumulation memory, for accumulation, through partial readout scanning of the shooting range with retained resolution in the pixel array 12 designated by the image extraction processing unit 32.

The switching unit 20 provides in a frame period a switching between the low-resolution whole picture scanning unit 14 and the high-resolution partial picture scanning unit 16 and outputs the low-resolution whole picture data and the high-resolution partial picture data in sequence.

The image processing unit 32 automatically determines a position to extract the high-resolution picture in the next frame, based on the low-resolution whole picture data output from the pixel array 12 and accumulated in the low-resolution whole picture accumulation unit 24 through the readout scanning of the low-resolution whole picture scanning unit 14, and instructs the high-resolution partial picture scanning unit 16 on the result of determination.

Associated with the image processing unit 32 is the image processing program retention unit 34 in which one or a plurality of image processing programs are loaded and retained such that the image processing programs required thereamong are introduced into the image extraction processing unit 32 and that the position to extract the high-resolution partial picture is automatically determined based on the low-resolution whole picture.

The image processing unit 32 outputs the result of processing of the image extraction position to the outside and receives the instruction of the image extraction position from the outside so as to be able to transmit the external instruction to the high-resolution partial picture scanning unit 16 prior to the image processing program.

The whole picture data transmission unit 26 and the partial picture data transmission unit 30 read picture data accumulated respectively in the low-resolution picture accumulation unit 24 and the high-resolution picture accumulation unit 28 to arrange them into NTSC format or VGA format, for later outputs, so that they can be observed with a video monitor, etc., or that as will be made clearer in the later description, picture data can be transmitted to the image processing system disposed at a remote position by use of the picture transmission unit.

Figure 2:
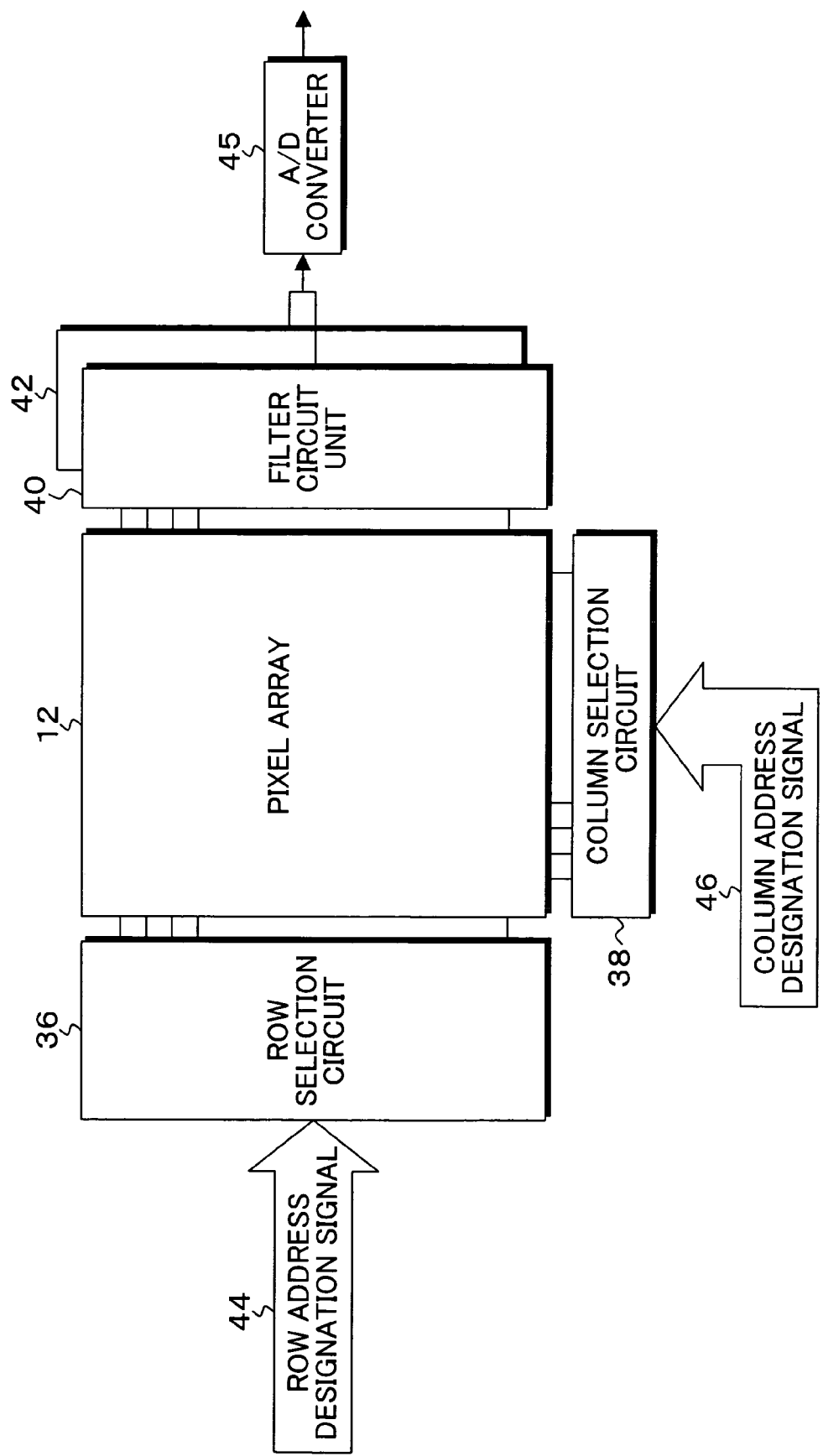
FIG. 2 is an explanatory diagram of a solid state image pickup device of FIG. 1.

FIG. 2 is an explanatory diagram of the solid state image pickup device 10 of FIG. 1. In FIG. 2, the pixel array 12 consists of $N_1 \times N_2$ matrix of pixels of photo-receptive elements for carrying out the photoelectric conversion which are two-dimensionally arranged, with each photo-receptive element converting the optical intensity into an electric signal at respective positions of optical images condensed through optical lenses.

Associated with the pixel array 12 are a line selection circuit 36 and a column selection circuit 38 which are able to selectively readout any pixels among the pixel array 12 depending on a line addressing signal 44 and a column addressing signal 46, respectively.

Toward the output of the pixel array 14 are a filter circuit unit 40 for issuing a low-resolution whole picture signal, a pixel voltage output circuit unit 42 for issuing a high-resolution partial picture signal, and an A/D converter 45 for converting a filter output voltage or a pixel output voltage into digital data.

Figure 3:
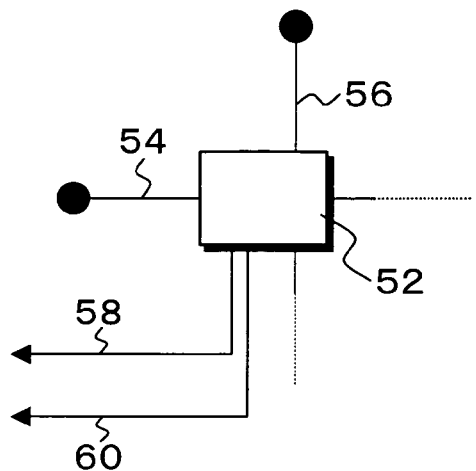
FIG. 3 is an explanatory diagram of a photo-receptive cell disposed in a pixel array.

FIG. 3 shows, in an exclusive manner, one of the photo-receptive cells (photo-receptive pixels) of the pixel array 12 of FIG. 2. In FIG. 3, associated with a photo-receptive cell 52 are a row selection line 54 for selecting a row and a column selection line 56 for selecting a column, as well as two output lines 58 and 60 for photoelectrically converting lights input by the photo-receptive cell 54 into a voltage level for output.

The output line 58 from the photo-receptive line 52 is an output line to the filter for generating a low-resolution whole picture signal, whilst the output line 60 is an output line for individual readout for generating a high-resolution partial picture signal.

Figure 4:
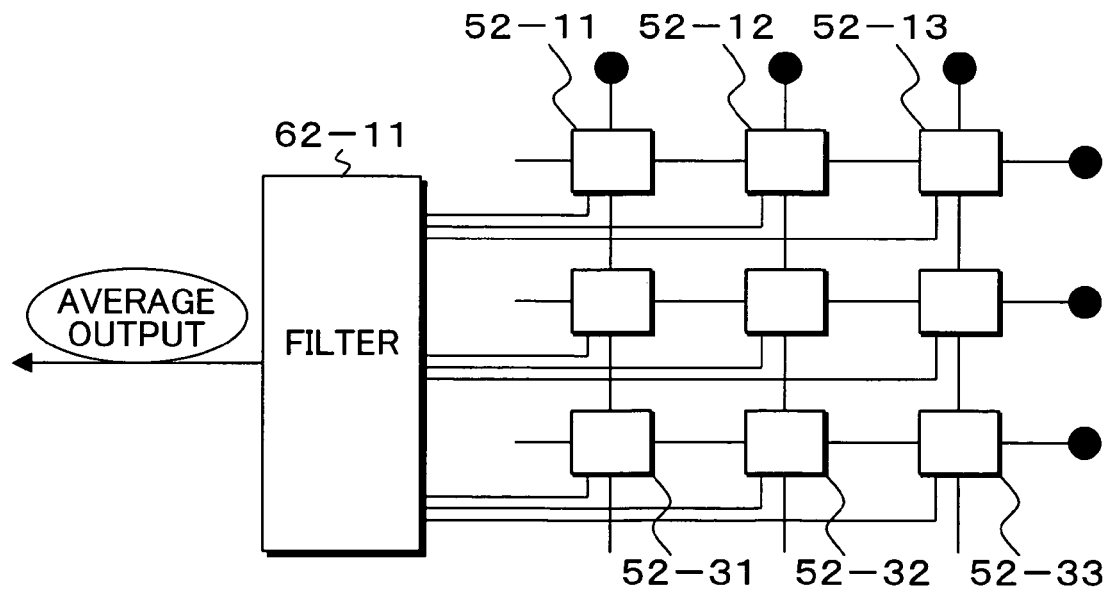
FIG. 4 is an explanatory diagram of photo-receptive cells and a filter for generating low-resolution picture pixel signal.

FIG. 4 shows one filter of the filter circuit unit 40 for generating a low-resolution whole picture signal provided toward the output of the pixel array 12 of FIG. 2, and a photo-receptive cell corresponding thereto. In FIG. 4, allocated to the filer 62-11 are 3×3 matrix of total nine (9) photo-receptive cells 52-11 to 52-33, from each of which the same output line 58 as the case of the photo-receptive cell 52 of FIG. 3 is input to the filter 62-11.

The nine (9) photo-receptive cells 52-11 to 52-33 impart addressing signals at one time to the three row selection lines and the three column selection lines to thereby allow their respective pixel voltages to be read at one time for input into the filter 62-11. The filter 62-11 serves to find out and output a sum or a mean value of the input pixel voltages, and in this example, it provides the mean value as its output.

Finding out the mean value (or the sum) of the plurality of photo-receptive cells 52-11 to 52-33 by the filter 62-11 means lowering the spatial resolution in the pixel array. In this example, 3×3 matrix of pixels are grouped into one group cell whose mean value is output from the filter 62-11, and hence the spatial resolution is lowered to (⅓)×(⅓).

Figure 5:
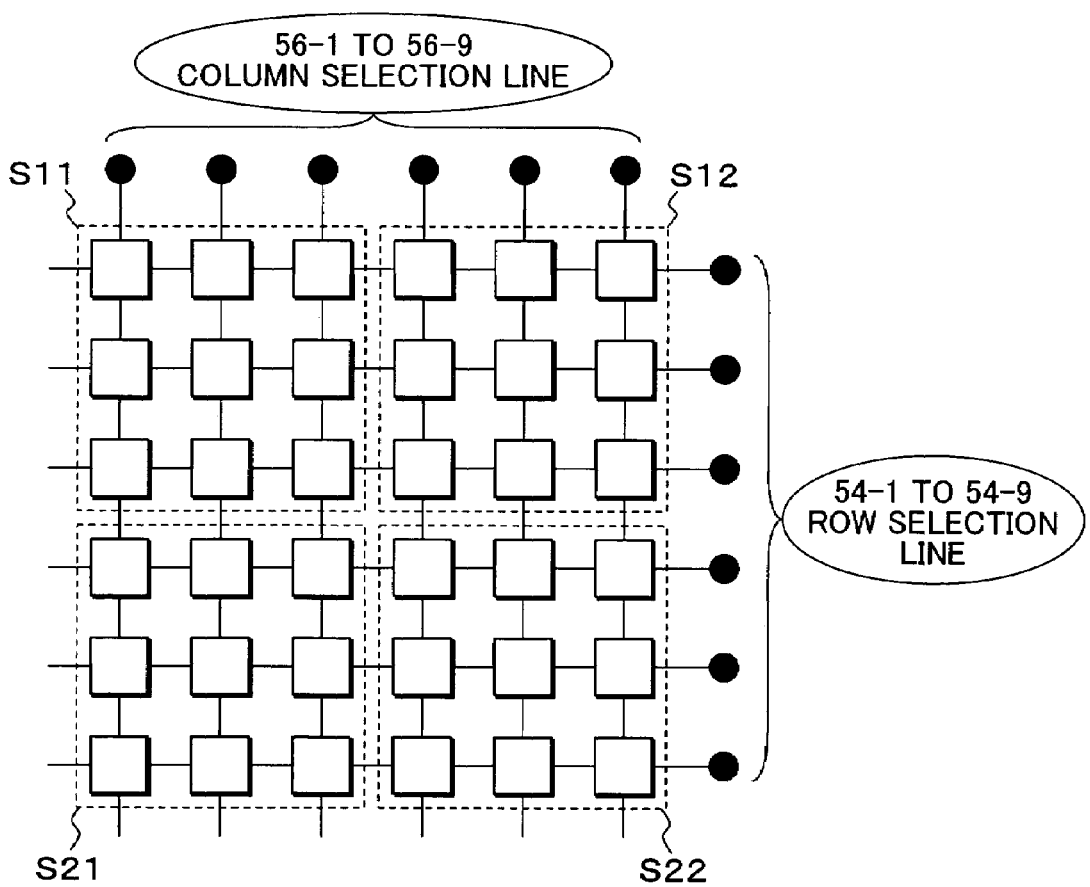
FIG. 5 is an explanatory diagram of photo-receptive cells for high resolution and of group cells for low resolution.

FIG. 5 is an explanatory diagram of two-dimensional arrangement of the group cell for a low-resolution picture which consists of the filter of FIG. 4 and the nine (9) photo-receptive cells, showing by way of example 6×6 matrix of pixels at the upper left in the pixel array 12 of FIG. 2. When expressing one group cell by Sij, i in the row direction and j in the column direction, four group cells can be expressed as group cells S11, S12, S21 and S22.

Associated with each cell are row selection lines 54-1 to 54-9 and column selection lines 56-1 to 56-9. When obtaining low-resolution pixel outputs from the filter by reading out on a group cell by group cell S11 to S22 basis, addressing signals are fed at one time to the three row selection lines and the three column selection lines for specifying nine (9) photo-receptive cells in each group cell S11 to S22 so that pixel voltages are read from the nine (9) photo-receptive cells of the selected group cell and input to the filter so that the mean voltage (or sum voltage) of the pixel voltages is output as the low-resolution pixel value.

Figure 6:
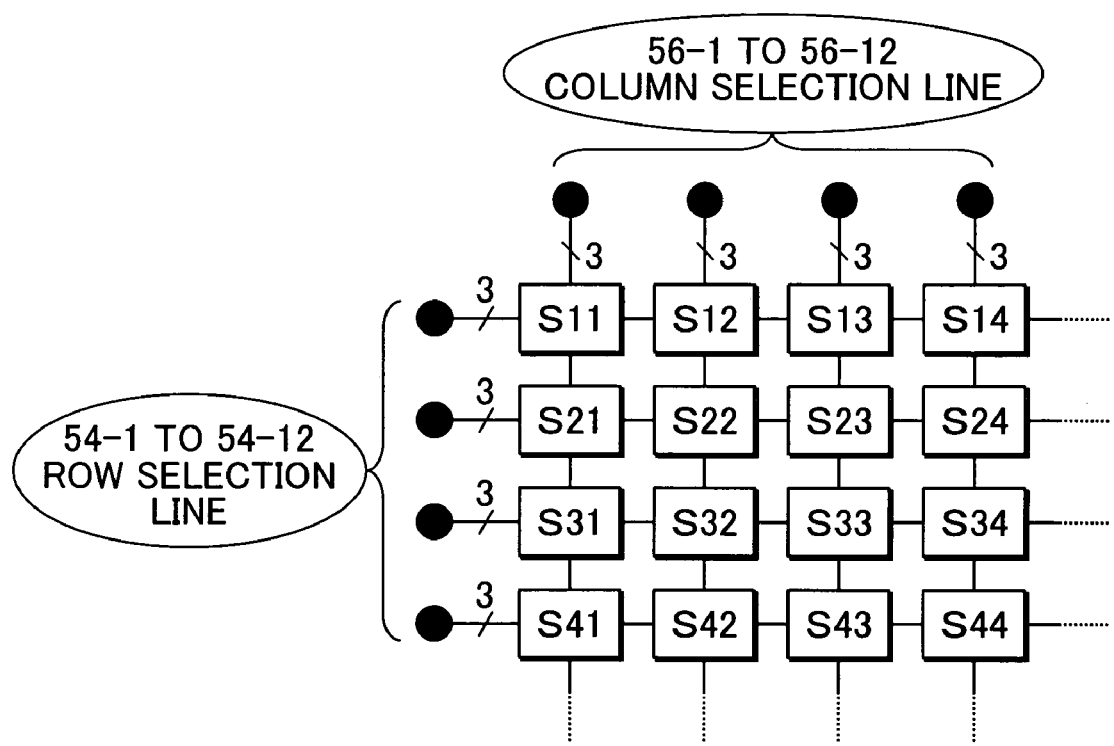
FIG. 6 is an explanatory diagram of a two-dimensional arrangement of group cells for low resolution pictures which are grouped on filter-by-filter basis.

FIG. 6 shows the portions of the group cells S1 to S44 of the pixel array 12 when reading the low-resolution picture signal.

The addressing signals are fed every three lines of the row selection lines 54-1 to 54-12 and the column selection lines 56-1 to 56-12 for the group cells S11 to S44 so that readout with any group cell designated can be achieved.

On the contrary, in case of reading out the high-resolution picture signals, addressing signals are fed for each one of the row selection lines 54-1 to 54-9 and the column selection lines 56-1 to 56-9 of FIG. 5 so that the high-resolution picture signals can be readout with any photo-receptive cells selected.

Figure 7A:
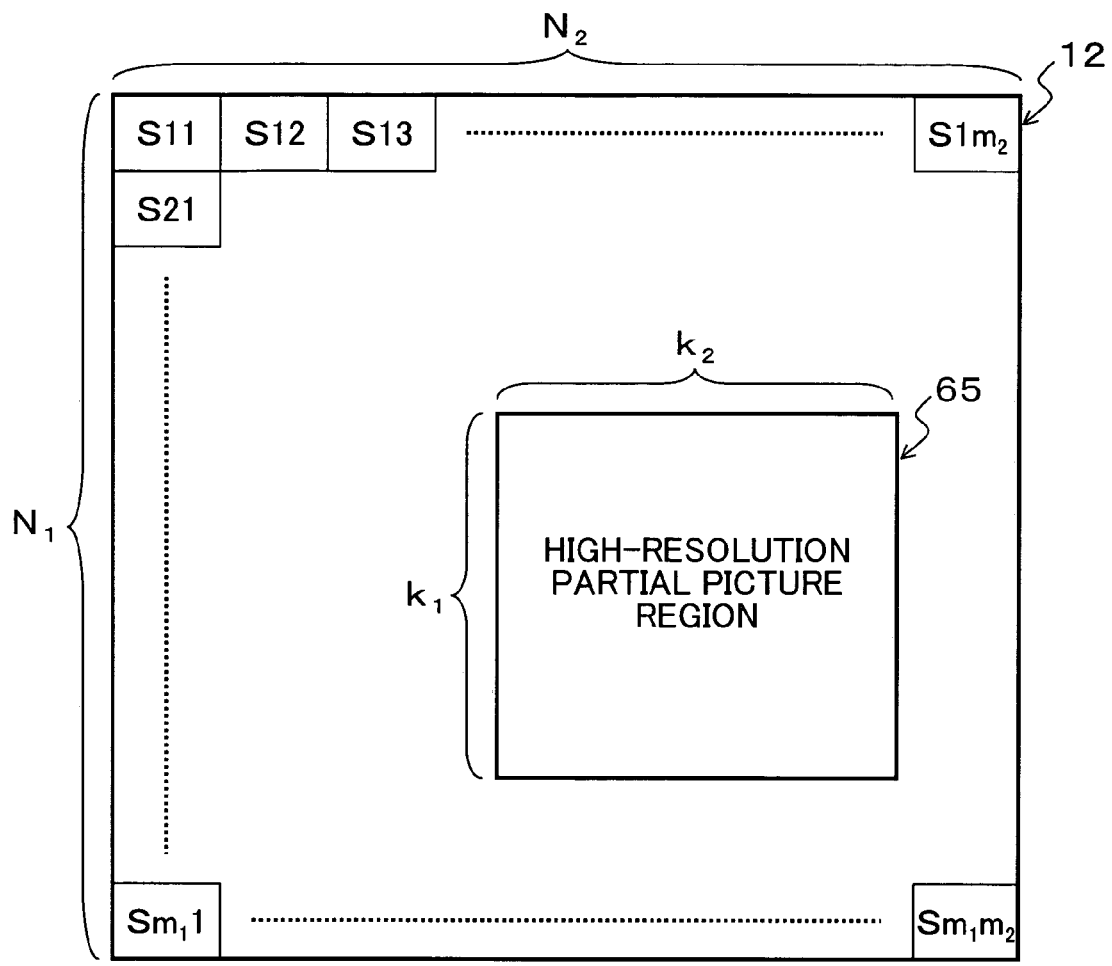
FIGS. 7A to 7C are explanatory diagrams showing the relationship among pixel array size, low-resolution pixel size and high-resolution partial pixel size in the present invention.
Figure 7B:
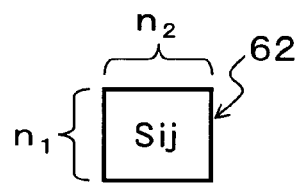
Figure 7C:
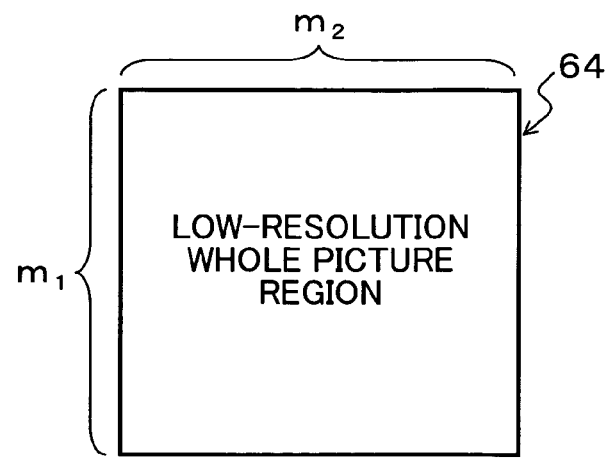

FIGS. 7A to 7C show the relationship among the array size of the pixel array 12 of FIG. 2, the low-resolution pixel size and the high-resolution partial pixel size. FIG. 7A shows the array size of the actual photo-receptive cell in the pixel array 12, having the pixel size of $N_1 \times N_2$ pixels in matrix.

In case of generating a low-resolution whole image region 64 having a small size matrix $m_1 \times m_2$ as shown in FIG. 7C, e.g., of 512×480 pixels in matrix of NTSC or of 640×480 pixels in matrix of VGA through the readout scanning of the pixel array 12 having the pixel size of $N_1 \times N_2$ pixels in matrix with the resolution lowered, $n_1 \times n_2$ matrix of group cell region 63 is defined as shown in FIG. 7B, which in turn is allocated to the group cells S11 to $SN_1N_2$ of the pixel array 12 as shown in FIG. 7A.

The following relations are established among the pixel sizes of the pixel array 12, the group cell 62 and the low-resolution whole image region 64.

$$m_1 = \lfloor N_1/n_1 \rfloor$$

$$m_2 = \lfloor N_2/n_2 \rfloor$$

where $\lfloor \; \rfloor$ denotes rounding off decimals to make integers.

By finding out the mean value (or the sum) through the input connection by the output line 58 from the photo-receptive cell to one filter as shown in FIG. 4 for each group cell 62 having a matrix of $n_1 \times n_2$ size, the high-resolution pixel region of $N_1 \times N_2$ in matrix of the pixel array 12 of FIG. 7A can be made with reduced resolution into the low-resolution whole image region 64 of a matrix of $m_1 \times m_2$ size as shown in FIG. 7C.

Through the local averaging processing in which with the plurality of photo-receptive cells making up the group cell, the means value or the sum is found out by the filter for the output in the form of pixel values with lowered resolution, it is possible to suppress the aliasing by which picture high-frequency components form false information in the low-resolution picture and consequently to obtain a satisfactory low-resolution whole picture for the image processing.

Further, shown in the pixel array 12 of FIG. 7A is an extraction region 65 of the high-resolution partial picture designated by the high-resolution partial picture scanning unit 16 under the image processing unit 32 of FIG. 1. The extraction region 65 is of the pixel size of $k_1 \times k_2$ in matrix, this $k_1 \times k_2$ pixel size being basically equal to the size of the low-resolution whole image region 64 of FIG. 7C.

If for example the low-resolution whole image region 64 is of 512×480 pixels in NTSC matrix or of 640×480 pixels in VGA matrix, then k1×k2 matrix of pixel size of the extraction region 65 of the high-resolution partial picture must be equal to the NTSC matrix of 512×480 pixels or to the VGA matrix of 640×480 pixels.

It is natural that the $k_1 \times k_2$ matrix of pixel size in the extraction region 65 of the high-resolution partial picture is not limited to the same size as the low-resolution whole picture region 64 but could be arbitrarily set depending on the size of the noted portion of the noted object whose detailed images are actually desired to be obtained on the condition that the readout operation is performed at a rate greater than the video rate.

Figure 8:
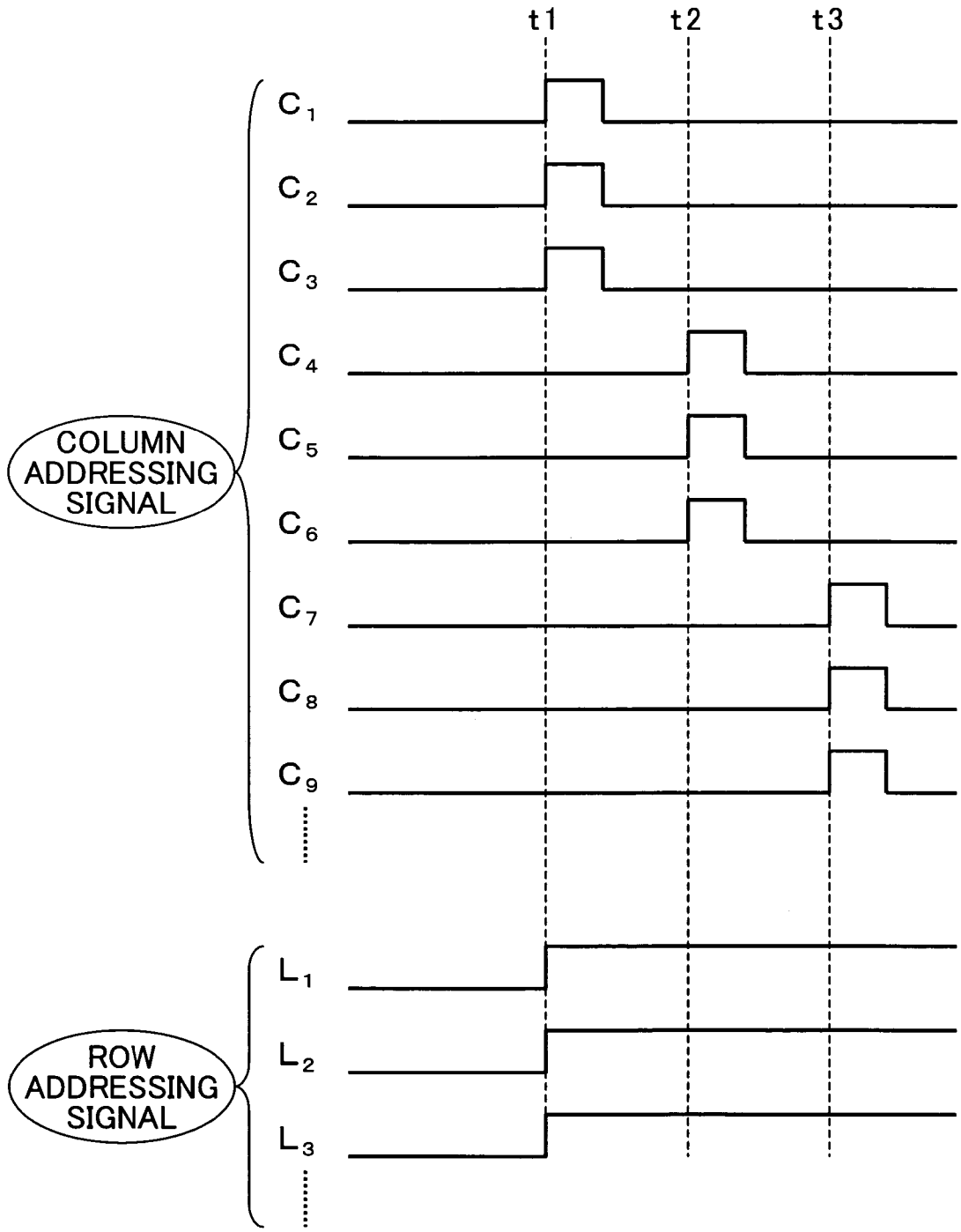
FIG. 8 is a timing chart of readout scanning for outputting low-resolution whole picture signals in the present invention.

FIG. 8 partially shows a timing chart of the readout scanning of the low-resolution whole picture signal in the pixel array 12 of FIG. 2. In FIG. 8, three-by-three column addressing signals C1 to C3, C4 to C6, and C7 to C9 are simultaneously fed at the timings of times t1, t2 and t3, and correspondingly thereto row addressing signals L1, L2 and L3 are successively fed from the time t1, whereby nine (9) photo-receptive cells are simultaneously designated at each of the times t1 to t3 so that the pixel voltages are read at one time into the corresponding filters for each group cell so as to output the averaged pixel voltage from the filter.

Figure 9:
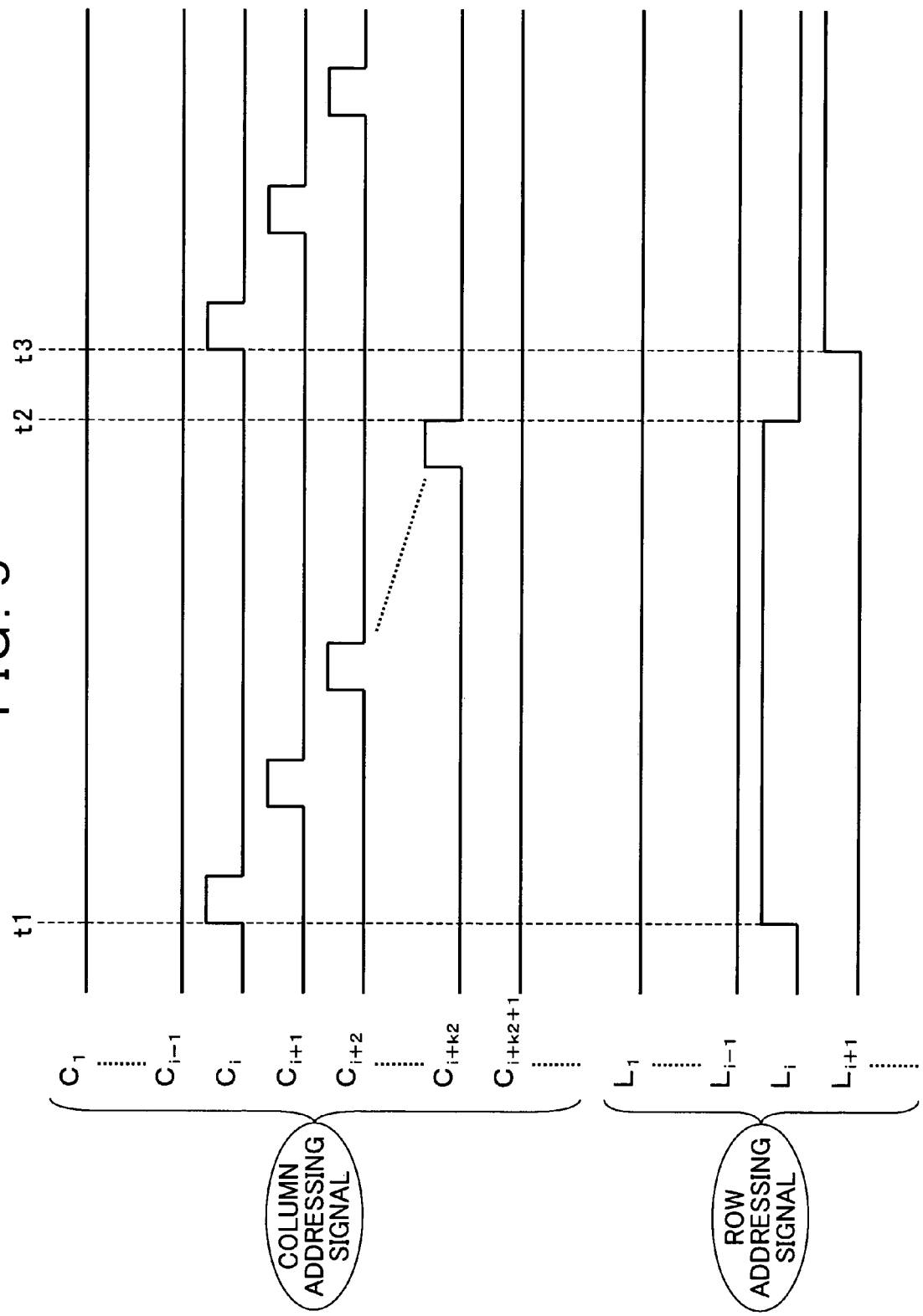
FIG. 9 is a timing chart of readout scanning for outputting high-resolution partial picture signals in the present invention.

FIG. 9 shows a part of the timing chart of the readout scanning of the extraction region 65 resulting in the high-resolution portion of FIG. 7A.

In FIG. 9, with a row addressing signal $L_i$ corresponding to the leading address at the image extraction position being output at the time t1, column addressing signals $C_j$ to $C_{j+k2}$ are output in sequence and readout on a reception basis from the same time $t_1$, after which a row addressing signal $L_{i+1}$ for the next row is fed at the time t3 and then the sequential outputs of the column addressing signals $C_j$ to $C_{j+k2}$ are similarly repeated. These operations are repeated until the row addressing signal reaches $L_{i+k1}$ (not shown)

Figure 10:
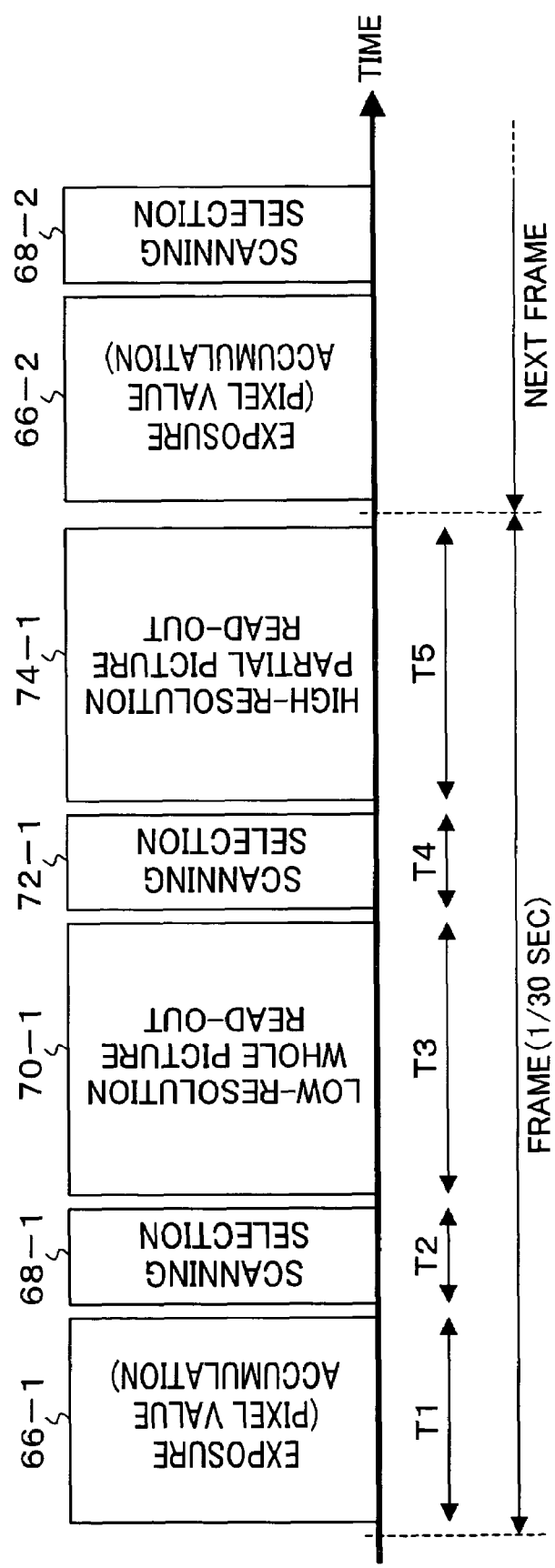
FIG. 10 is an explanatory diagram of readout scanning timing of a low-resolution whole picture and a high-resolution partial picture for each frame period in the present invention.

FIG. 10 is an explanatory diagram of the timing to readout and scan the low-resolution whole picture and the high-resolution partial picture for each frame period by the switching unit 20 of FIG. 1.

In FIG. 10, when taking notice of the timing in the frame period resulting in 1/30 sec at the video rate, an exposure to light (pixel value accumulation) 66-1 is performed during the first period of time T1 in which optical images input through the lens system are received by the arrayed cells of the pixel array 12 and electric charges are accumulated through the photoelectric conversion.

Simultaneously with the completion of this exposure to light 66-1, the switch 22-1 is switched to the low-resolution whole picture scanning unit 14 while simultaneously the switch 22-1 also performs the scanning selection 68-1 for switching to the low-resolution whole picture accumulation unit 24. This allows a circuit system for reading out and scanning the low-resolution whole picture to be established.

Then, through the readout scanning for each group cell of $n_1 \times n_2$ size whose input is connected for each filter by the scanning signals from the low-resolution whole picture scanning unit 14 during the period of time T3, the low-resolution whole picture signal is output from the pixel array 12 and is converted into digital data, which in turn is accumulated in the low-resolution whole picture accumulation unit 24.

Then, at the timing of T4, the switch 22-1 is switched to the high-resolution partial picture scanning unit 16, while simultaneously a scanning selection 72-1 is carried out in which the switch 22-2 is switched to the high-resolution partial picture accumulation unit 28.

Then, over the next period of time T5, the photo-receptive cell based readout scanning is performed of the extraction region of the high-resolution partial picture of pixel size of $k_1 \times k_2$ in matrix designated by the image processing unit 32 in response to the row and column addressing signals from the high-resolution partial picture scanning unit 16, to thereby issue a high-resolution partial picture signal which in turn is converted into digital data by an A/D converter and then accumulated in the high-resolution partial picture accommodation unit 28.

The next frame similarly experiences the exposure to light 66-2, the scanning selection 68-2, the low-resolution whole picture readout 70-1 (not shown) and the high-resolution partial picture readout 70-2 (not shown) in a repetitive manner. During the next frame, the picture data retained in the low-resolution whole picture accumulation unit 24 and the high-resolution partial picture accumulation unit 28 in the previous frame is subjected to the shaping required for a single piece of picture data in a predetermined format in the whole picture data transmission unit 26 and the partial picture data transmission unit 30, respectively, and then is output as the low-resolution whole picture data and the high-resolution partial picture data to the outside.

During the frame period in which are carried out the exposure to light, scanning selection, low-resolution whole picture readout, scanning selection and high-resolution partial picture readout, the image processing unit 32 determines the extraction position of the high-resolution partial picture on the basis of the low-resolution whole picture data in the previous frame accumulated in the low-resolution whole picture accumulation unit 24, and instructs the high-resolution partial picture scanning unit 16 on the extraction position in the next frame.

Although in this embodiment, the image processing unit determines the picture extraction position of the high-resolution partial picture based on the low-resolution whole picture data of the previous frame in accordance with the image processing program, image extraction mode by the external instruction may be selected in order to ensure the acquisition of the high-resolution partial picture at the externally designated extraction position.

Selection of this external instruction mode enables a high-resolution partial picture at the externally designated position to be acquired prior to the image processing program when the image processing unit 32 externally receives an instruction signal indicative of the image extraction position. Naturally, when the externally instructed mode is turned off, the external instruction signal is ignored so as to be able to automatically designate the extraction position of the high-resolution partial picture based on the image processing program.

Description will then be made of processing for acquiring the detailed pictures of a plurality of objects as noted objects which move over a wide range, the processing is a process to acquire the high-resolution partial picture by the image processing unit 32 provided in the image inputting apparatus of FIG. 1.

Such a processing for acquiring the detailed pictures as the high-resolution partial picture in the image processing unit 32 allows any processes other than tracking the moving object. The contents of the image processing depend on the image processing program retained in the image processing program retention unit 34 and therefore this description is a mere example of the possible image processing programs.

Figure 11:
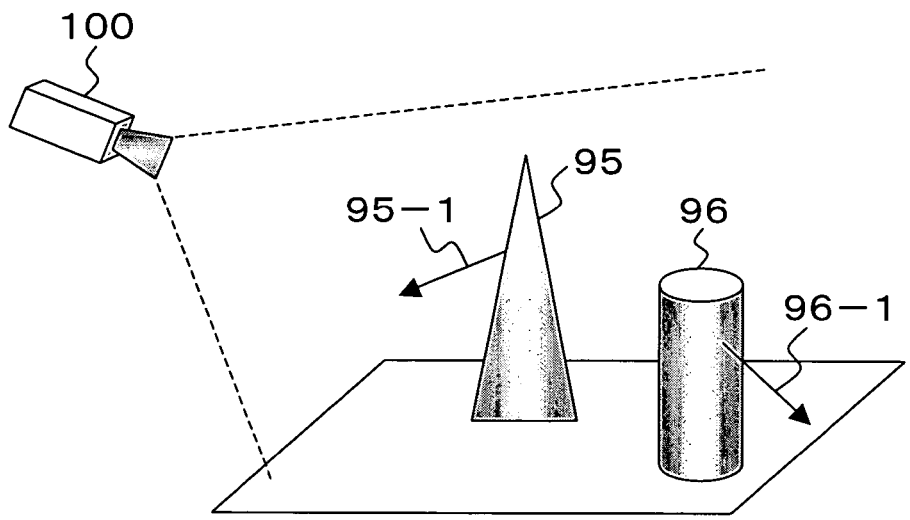
FIG. 11 is an explanatory diagram of the status of observation effected by a picture inputting apparatus of the present invention.

FIG. 11 is an explanatory diagram of the status of observation by the picture inputting apparatus of the present invention, for acquiring the detailed pictures of a plurality of objects moving over a wide range. The picture inputting apparatus of the present invention generally designated at 100 is located at an appropriate position capable of capturing a plurality of moving objects within the picture range, the apparatus shooting for example a site over which objects 95 and 96 travel back and forth. In this case, the object 95 moves toward a motion vector 95-1 whilst the object 96 moves toward a motion vector 96-1.

Figure 12:
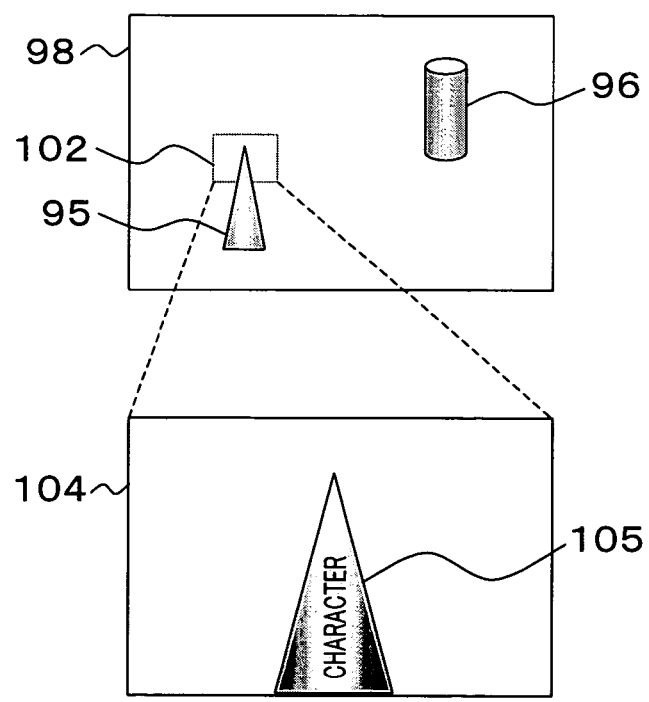
FIG. 12 is an explanatory diagram of a low-resolution whole picture and a target object high-resolution partial picture, obtained by the observation of FIG. 11.

At that time, it is possible for the picture inputting apparatus 100 of the present invention to acquire a low-resolution whole picture 98 as shown in FIG. 12, and simultaneously to acquire a high-resolution partial picture 104 of a set noted portion 105 of the moving object 95 in the low-resolution whole picture 98 so as to acquire detailed picture, e.g., a character picture of the noted portion 105 at the extremity of the object 95.

The object of the low-resolution whole picture 98 acquired by the picture inputting apparatus 100 of the present invention is to make judgment of the place where the object lies within the wide range of monitoring and judgment of the existence or absence of the noted portion to be acquired as a high-resolution portion picture, which has a feature capable of widening the space shot by a single picture inputting apparatus 100 due to its wide range shooting.

The high-resolution partial picture 104 is a detailed picture of a noted portion obtained by selecting only the noted portion, which has a feature capable of capturing without exception, e.g., even character information which may collapse when the wholeness is only viewed due to insufficient resolution.

By setting the image sizes of the two pictures, i.e., the low-resolution whole picture 98 and the high-resolution partial picture 104 to be 640×480 pixels in VGA matrix, it is possible to acquire two pictures at a high rate equal to or greater than the video rate of 30 fps and to cope with the moving objects whose positions vary with time. The picture inputting apparatus 100 of the present invention is characterized in that it is capable of specifying the positions of all the objects even when a plurality of objects travel back and forth since it can capture the whole picture at all times.

Figure 13:
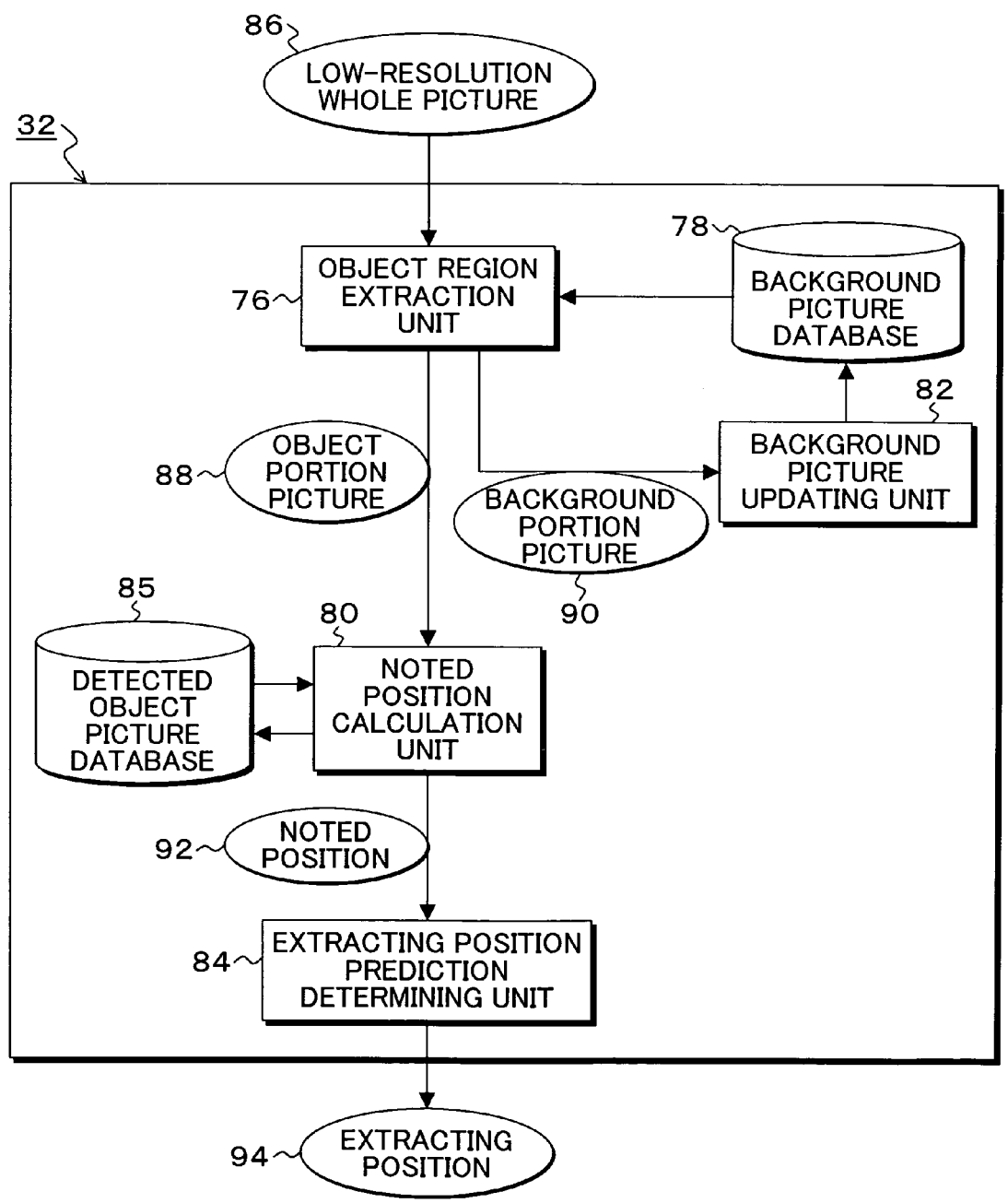
FIG. 13 is a block diagram of a functional configuration of an image processing unit of FIG. 1.

FIG. 13 is a block diagram of image processing function implemented by a processing program for acquiring detailed pictures of the noted portions of a plurality of objects which move over a wide range.

In FIG. 13, the image processing unit 32 comprises as its image processing program function an object region extraction unit 76, a noted position calculation unit 80, a background picture updating unit 82 and an extracting position prediction determining unit 84, as well as a background picture database 78 and a detected object picture database 84 acting as databases storing the required amount of data for the processing.

The object region extraction unit 76 inputs low-resolution whole picture data 86 and detects as an object region a site where the pixel value undergoes a change in excess of a certain value from the difference between the input low-resolution whole picture data 86 and the background picture data stored in the background picture database 78 after updating in the previous frame. After the acquisition of this object region picture, the object region extraction unit 76 calculates the position of the object by extracting the mass of the image regions from the object region image and sends an object portion picture 88 to the noted position calculation unit 80.

The noted position calculation unit 80 determines an object to be shot in the next frame and a noted position of the object in the picture from the region information of a plurality of objects by the object portion picture 88 input. Utilized for the detection of this noted position is detected object picture data retained in the detected object picture database 85 and updated in the previous frame.

On the basis of the position of the noted point in the image based on the noted position data 92 obtained by the noted position calculation unit 80 as well as the motion information of that object obtained as a result of observations in the preceding frames, the extraction position prediction determining unit 84 predicts the position in the next frame, determines the extraction position of an image whose high-resolution partial picture is to be obtained in the next frame, and outputs extraction position information 94 to a high-resolution partial picture operation unit 16 of FIG. 1.

The background picture updating unit 82 updates a corresponding pixel in the background picture of the previous frame accumulated in the background picture database 78 based on the background picture data 90 obtained by the object region extraction unit 76, to prepare for the detection of a moving object in frames which follow.

Processings effected by the image processing unit 32 of FIG. 13 will then specifically be described with reference to FIGS. 14A to 14D and FIGS. 15A to 15E.

Figure 14A:
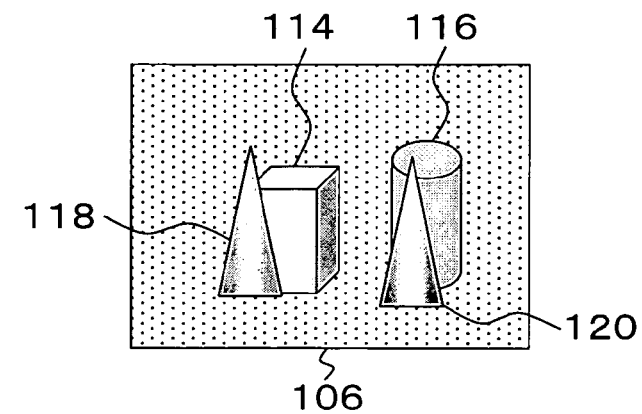
FIGS. 14A to 14D are explanatory diagrams of moving object processing in FIG. 13.

First, assume that the object region extraction unit 76 of FIG. 13 inputs an input picture 106 in the form of the low-resolution whole picture as in FIG. 14A for example. In the input picture 106 there exist objects 114 and 116, in front of which other objects 118 and 120 exist.

Figure 14B:
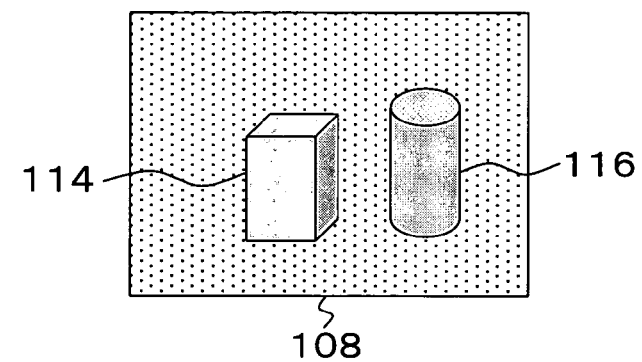

At that time, assume that the background picture database 78 retains a background picture 108 as in FIG. 14B. That is, there exist the objects 114 and 116 in the background picture 108. Thus, the object picture extraction unit 76 figures out the difference between pixel values of pixels of the input picture 106 and the background picture 108, compares in magnitude the value of the difference with a predetermined threshold value, labels pixels not less than the threshold value as the pixels of the moving objects, and differently labels pixels less than the threshold value as the pixels of non-moving objects.

In this case, the operation FD implementation method for obtaining the difference between the pixel values can optionally be employed, without specifically being limited, depending on whether the image is of a monochrome or color and on the use. When the image is of monochrome for example, $$FD(I1^{(x1,y1)}, I2^{(x2,y2)}) = |I1^{(x1,y1)} - I2^{(x2,y2)}|$$

where $I1^{(x1,y1)}$ represents pixels values of coordinates $x_1$, $y_1$ of an input image, and $I1^{(x2,y2)}$ represents pixel values of coordinates $x_2$, $y_2$ of the input image, is used to find out the difference between the pixel values.

Figure 14C:
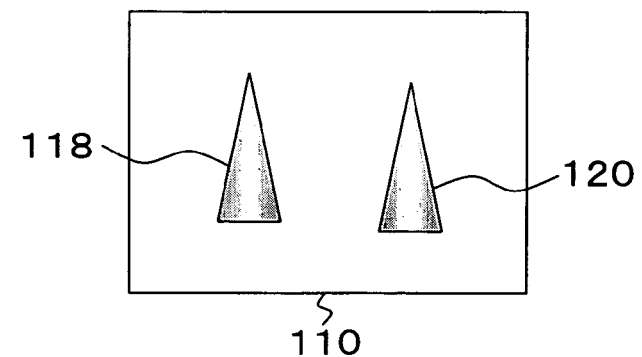
Figure 14D:
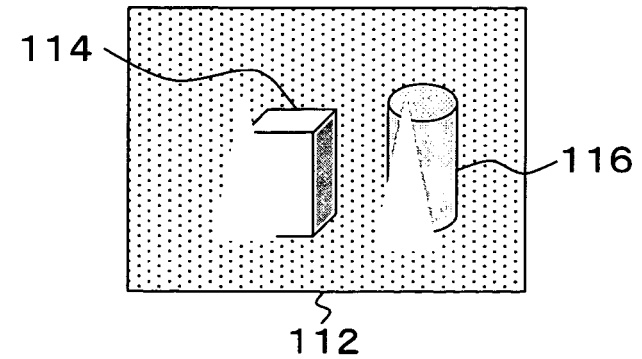

As a result of such processing of the object region extraction unit 76, an object portion picture 110 as in FIG. 14C and a background portion picture 112 as in FIG. 14D are generated and the object portion picture 110 is output to the noted position calculation unit 80 and the background portion picture 112 is output to the background picture updating unit 82.

In this case, the object portion picture 110 contains new objects 118 and 120 which do not exist in the background picture 108, whereas the background portion picture 112 is a picture obtained by deleting the objects 118 and 120 in the object portion picture 110 from the input picture 106.

Next, the noted position calculation unit 80 inputs the object partial picture data 88 from the object region extraction unit 76 and creates object label images differently labeled for each mass indicative of an object. That is, since the object partial picture data 88 from the object region extraction unit 76 is an object point image in which a label indicative of an object is affixed to a pixel indicative of an object portion, the noted position calculation unit 80 checks the type of the pixel to which the object label is affixed, extracts the mass resulting from the pixel having the object label, and creates the object label image in which a different label is affixed for each mass.

Figure 15A:
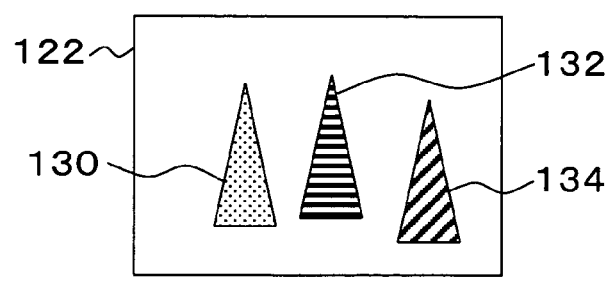
FIG. 15A to 15E are explanatory diagrams of undetected object extraction processing in FIG. 13.

FIG. 15A shows an example of an object label image 122 figured out by the noted position calculation unit 80, this example representing the status in which three objects 130, 132 and 134, e.g., three persons are obtained.

Figure 15B:
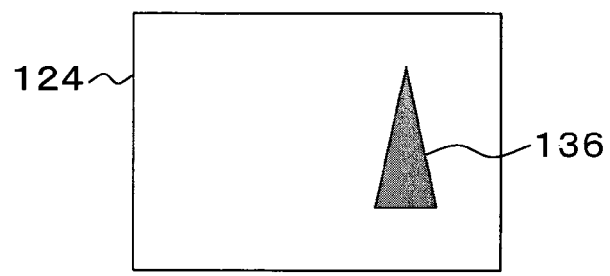
Figure 15C:
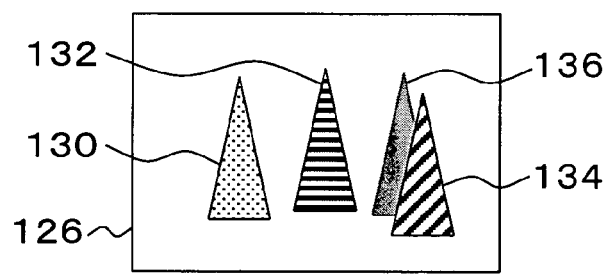
Figure 16A:
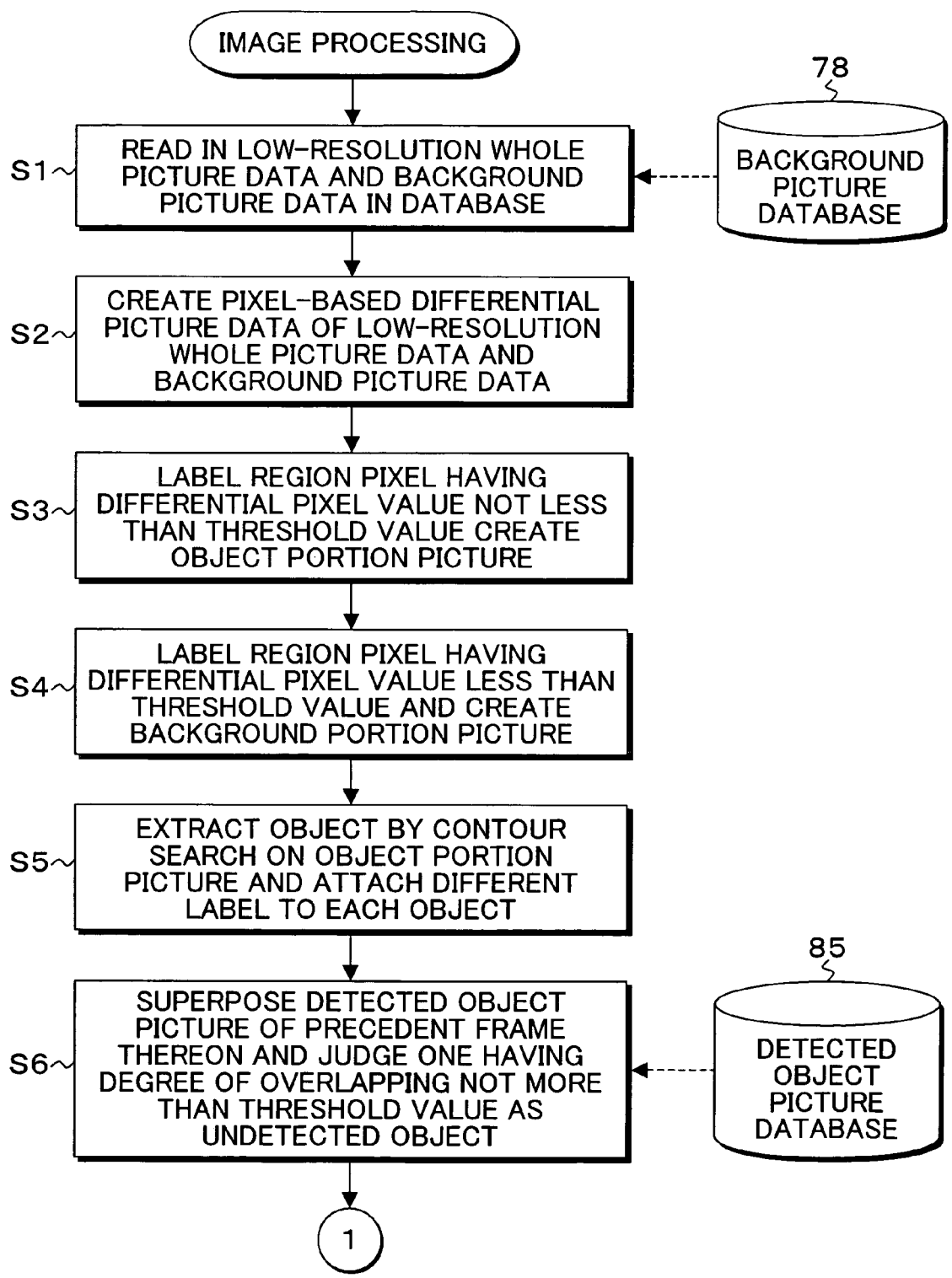
FIGS. 16A and 16B are flowcharts of image processing of FIG. 11.

A label superposing picture 126 is then created by superposing as shown in FIG. 15C the object label picture 122 of FIG. 15A on the detected object picture 124 in which there exists an object 136 whose detailed picture in the form of the high-resolution partial picture has been acquired and which has been created through processings in the preceding frames as in FIG. 15B. An overlapping portion extracted picture 127 of FIG. 16A is then extracted in which the degree of overlapping is extracted in each of the objects 130, 132 and 134 in the object label image 122 on the detected object 136 of the detected object picture 124.

As to this overlapping portion extracted image 127, the object 136 of the previous frame has an overlap 134 on the detected object 134 but the objects 130 and 132 do not have any overlap thereon. Thus, for the judgment of the degree of overlapping, extracted as undetected objects are the objects 130 and 132 not more than the threshold value and having a sufficiently low degree of overlapping.

Figure 15D:
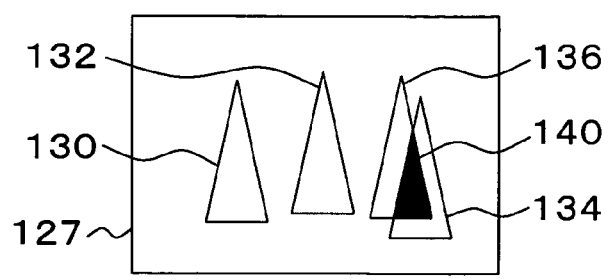

In case of detection of a plurality of undetected objects 130 and 132 as in this example, one undetected object is selected which lies at the outermost of the picture or which has a strongest possibility deviating from the picture from among the undetected objects. In the example of FIG. 15D, the object 130 at the leftmost of the picture is selected as the undetected noted object.

Next obtained is a noted point desired to be shot as the high-resolution partial picture in the region of the noted object 130 selected, e.g., a position in the whole picture of a portion of a face having maximal amounts of information in case of a person, the thus obtained result being output as a noted position 92 to the extracting position prediction detecting unit 84.

Figure 15E:
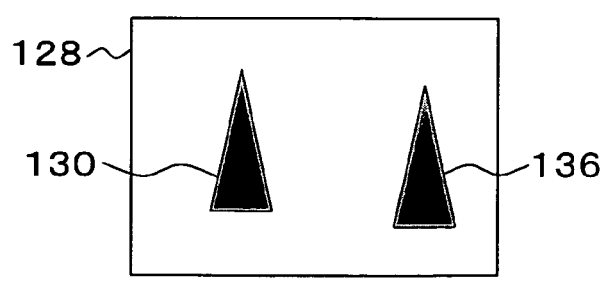

The noted position calculation unit 80 updates the detected object image in the detected object picture database 84 for use in the judgment processing in the next frame. More specifically, as shown in FIG. 15E, the noted position calculation unit 80 copies the noted object 130 detected as an undetected object and the detected object 134 judged to have a degree of overlapping of the overlap 140 not less than the threshold value, to create an updated detected object picture 128 for the storage into the detected object picture database 85.

Then, using the position of the noted point obtained in the previous frame and using, when the target whose detailed picture is to be shot has already been observed, the position of the noted point in the previous frame and the history of the past motion, the extracting position prediction detecting unit 84 creates a motion model to predict the position to be observed in the next frame and determines the prediction position as extracting position data 94 for acquiring detailed pictures in the form of a high-resolution partial picture, for output.

In this case, the detailed picture of the noted object having the extracting position data 94 output can be acquired in the next frame, and hence the past motion history is deleted at this point of time.

On the contrary, when the target to create its detailed picture first appeared in the previous frame, there is no past motion history, and therefore the noted position data 92 calculated by the noted position calculation unit 80 is output intactly as an extracting position data 94 for acquiring the detailed picture.

Although the position prediction method for predicting the position in the motion model for use in the extracting position prediction and the position in the next frame can be any appropriate method, it may be given by the following expression using the position of the past position frame, i.e., the last position, with the motion model being a uniform rectilinear motion.

$$\begin{cases} \hat{x}_{i+1} = a_x x_i + b_x \\ \hat{y}_{i+1} = a_y y_i + b_y \end{cases}$$

where ($x_i, y_i$) represents a noted position in the current frame;

($\hat{x}_{i+1}, \hat{y}_{i+1}$) represents a predicted position to which the noted position moves in the next frame: and {$a_x, a_y, b_x, b_y$} represents motion parameters.

Finally, the background picture updating unit 82 performs the updating processing in which a new background picture is created using a background portion picture 112 of FIG. 14D for example acquired by the object region extraction unit 76 and a background picture 108 of FIG. 14B for example retained in the background picture database 78. The updating processing specifically includes using, for each pixel having a value in the background portion image 112 of FIG. 14D, its pixel value P1(x, 6) and a value $P_2'(x,y)$ of a pixel in the background picture 108 having the same coordinates to create a new value $P_2^{t+1}(x,y)$ of the pixel in the background picture 108.

Although this updating expression for use in the creation of the pixel value can be any appropriate updating expression, it may be given as follows using a mixed coefficient β ($0 \leq \beta \leq 1$).

$$P_2^{t+1} = \beta P_1 + (1-\beta) P^{hd\ 2t}$$

Figure 16B:
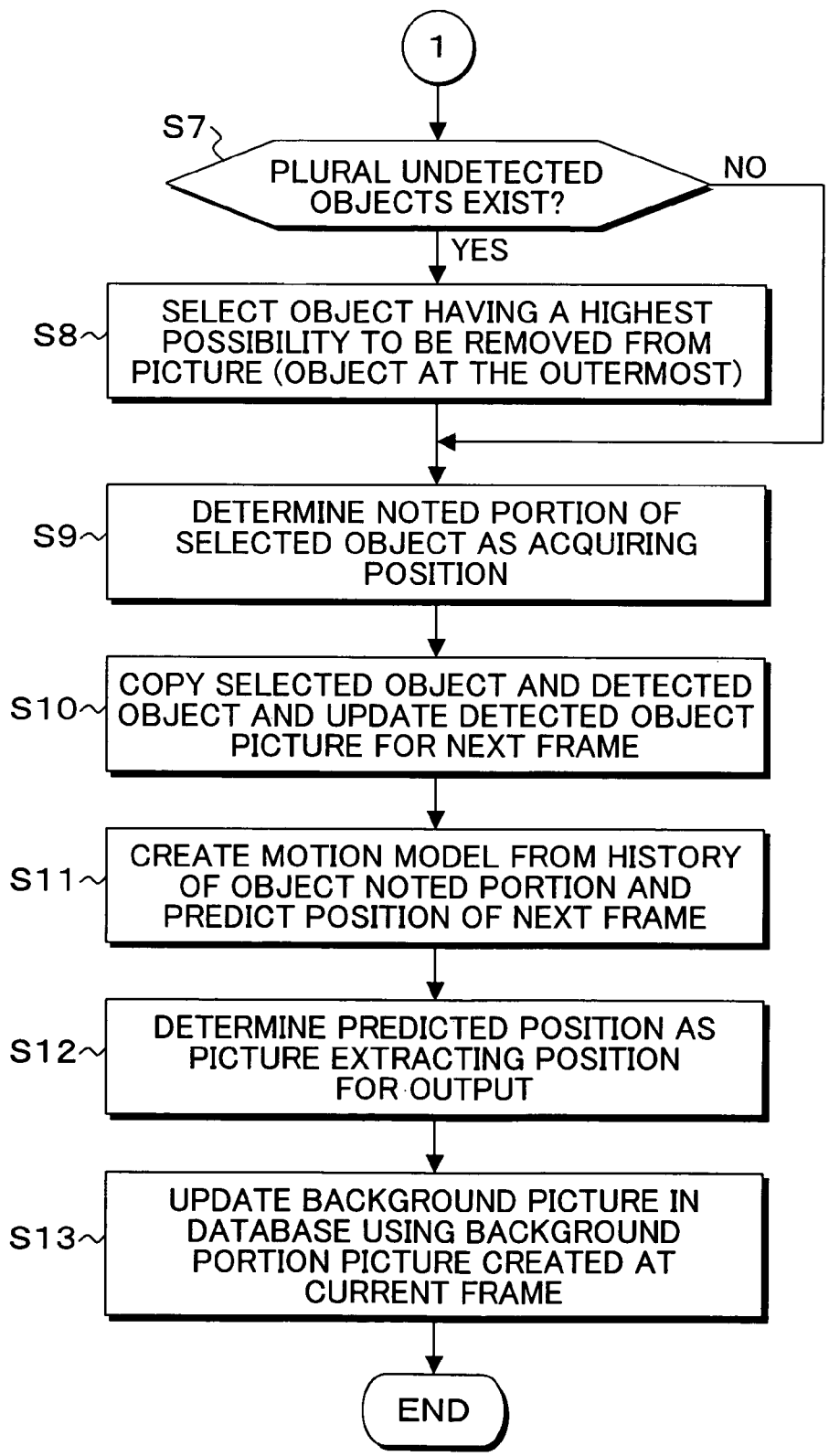

FIGS. 16A and 16B are flowcharts showing the procedure of processing effected by the image processing unit 32 of FIG. 3. In FIGS. 16A and 16B, a low-resolution whole picture data and a background picture data from the database 72 are first read at step S1, and difference picture data between the two data for each pixel is created at step S2, after which a label indicative of a moving object is affixed to the pixel region having a difference pixel value not less than a threshold value to create an object portion picture at step S3 whilst another label indicative of a non-moving object is affixed to the pixel region having a difference pixel value less than the threshold value to create a background portion picture at step S4.

Then, at step S5, an object resulting in a mass of region is extracted through the contour search of the pixel value of the object portion picture, to differently perform labeling for each object. Then, at step S6, detected object picture in the previous frame acquired from the database is superposed on the object picture labeled at step S5 and, if the degree of overlapping is not more than a threshold value, then it is judged to be an undetected object.

Then, at step S7, it is checked whether a plurality of undetected objects exist, and if affirmative, then selection is made of an object having a strongest possibility deviating from the picture at step S8. Then, at step S9, a noted portion of the selected object, which may be a face portion in case of a person, is determined as the acquisition position of the detailed picture.

Next at step S10, the selected object and the detected object are copied to update the detected object picture for the next frame. Then at step S11, a motion model is created from the history of the object noted portion to predict the position of the next frame, and at step S12 the predicted position is determined and output as the picture extraction portion.

It is to be noted when the noted object appears for the first time that the processings of steps S11 and S12 include intactly outputting the acquisition position determined at step S9. Then at step S13, the background picture of the previous frame retained in the background picture database 72 is updated using the background portion picture created in the previous frame. Such processings of the steps S1 to S13 are executed for each frame.

FIG. 17 is a block diagram of a second embodiment of a picture inputting apparatus in accordance with the present invention. This embodiment is characterized in that an image processing unit 32-1 further inputs high-resolution partial picture data in addition to the low-resolution whole picture data, to perform any image processing.

In FIG. 17, same as those in the above embodiment are the solid state image pickup device 10 having a pixel array, the low-resolution whole picture scanning unit 14, the high-resolution partial picture scanning unit 16, the timing generation unit 18, the switching unit 20, the switches 22-1 and 22-2, the low-resolution whole picture accumulation unit 24, whole picture data transmission unit 26, the high-resolution partial picture accumulation unit 28 and the partial picture data transmission unit 30.

In addition to those, the second embodiment is characterized in that an image processing unit 32-1 is provided which inputs low-resolution whole picture data from the low-resolution whole picture accumulation unit 24 as well as high-resolution partial picture data from the high-resolution partial picture accumulation unit 28, thereby making it possible to perform any image processing including the processing for determining the extracting position of the high-resolution partial picture by using both the low-resolution whole picture data and the high-resolution partial picture data or only the high-resolution partial picture data.

FIG. 18 is a block diagram of the functional configuration of the image processing unit 32-1 of FIG. 17. In FIG. 18, the image processing unit 32-1 is essentially the same as the image processing unit 32 of FIG. 13 in the first embodiment in that it includes the object region extraction unit 76, the background picture database 78, the noted position calculation unit 80, the background picture updating unit 82, the extracting position prediction determining unit 84 and the detected object picture database 85, but the image processing unit 32-1 is characterized in that it additionally includes a false prediction detection unit which inputs high-resolution partial picture data 138 for processing.

The false prediction detection unit 140 retains as predicted low-resolution whole picture data in the previous frame the low-resolution whole picture data in the vicinity of the noted position calculated by the noted position calculation unit 80 prior to the execution of prediction by the extracting position prediction determining unit 84, and compares this predicted low-resolution whole picture data with the high-resolution partial picture data 138 acquired in the previous frame.

If there is a great difference between the two as a result of comparison of the predicted low-resolution picture in the vicinity of the noted position of the previous frame with the high-resolution partial picture in the previous frame, then it is judged that the prediction of position for acquiring a high-resolution partial picture of the noted portion is false, and the noted position calculation unit 80 is posted on a non-acquisition 142 of the detailed picture which is the high-resolution partial picture of the noted object so that the status of the noted position calculation unit 80 is changed into a status where the noted object calculated in the previous frame is again extractable.

That is, the object picture of the noted object calculated in the previous frame is deleted from the detected object pictures updated in the previous frame in the detected object picture database 85 provided in the noted position calculation unit 80, to thereby make a setting such that a high-resolution partial picture of the noted object can further be acquired.

More concretely, if an updated detected object image 128 as shown in FIG. 15E is retained in the previous frame, then since an object 130 is a noted object, the object label corresponding to the noted object 130 is removed to achieve a change into a detected object picture 124 as shown in FIG. 14B.

For this reason, when the false prediction takes place without the high-resolution partial picture being obtained of the noted portion associated therewith, it is possible to again acquire the high-resolution partial picture of the same noted object through the same processing as in the previous frame.

Figure 19A:
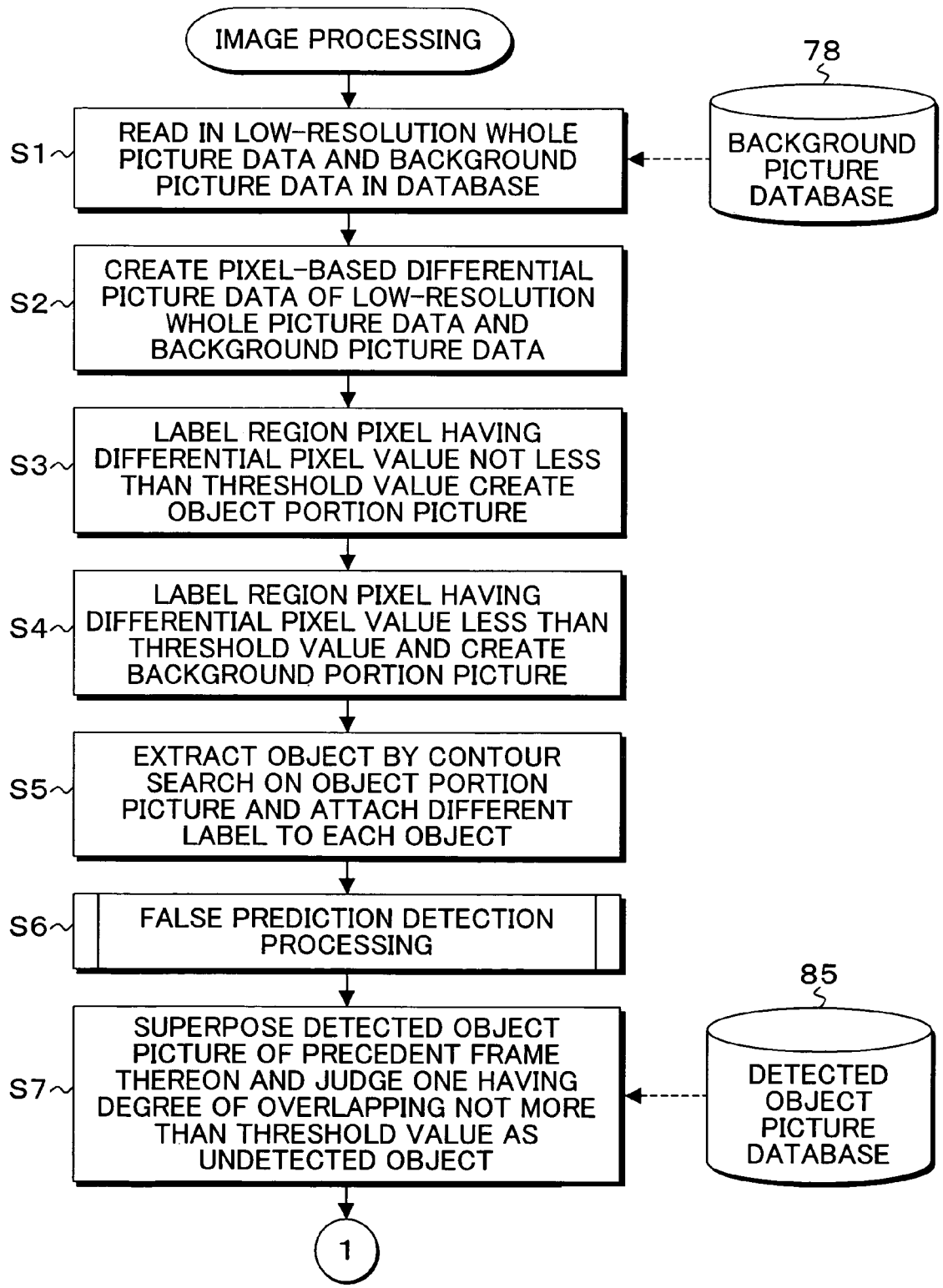
FIGS. 19A and 19B are flowcharts of image processing of FIG. 17.
Figure 19B:
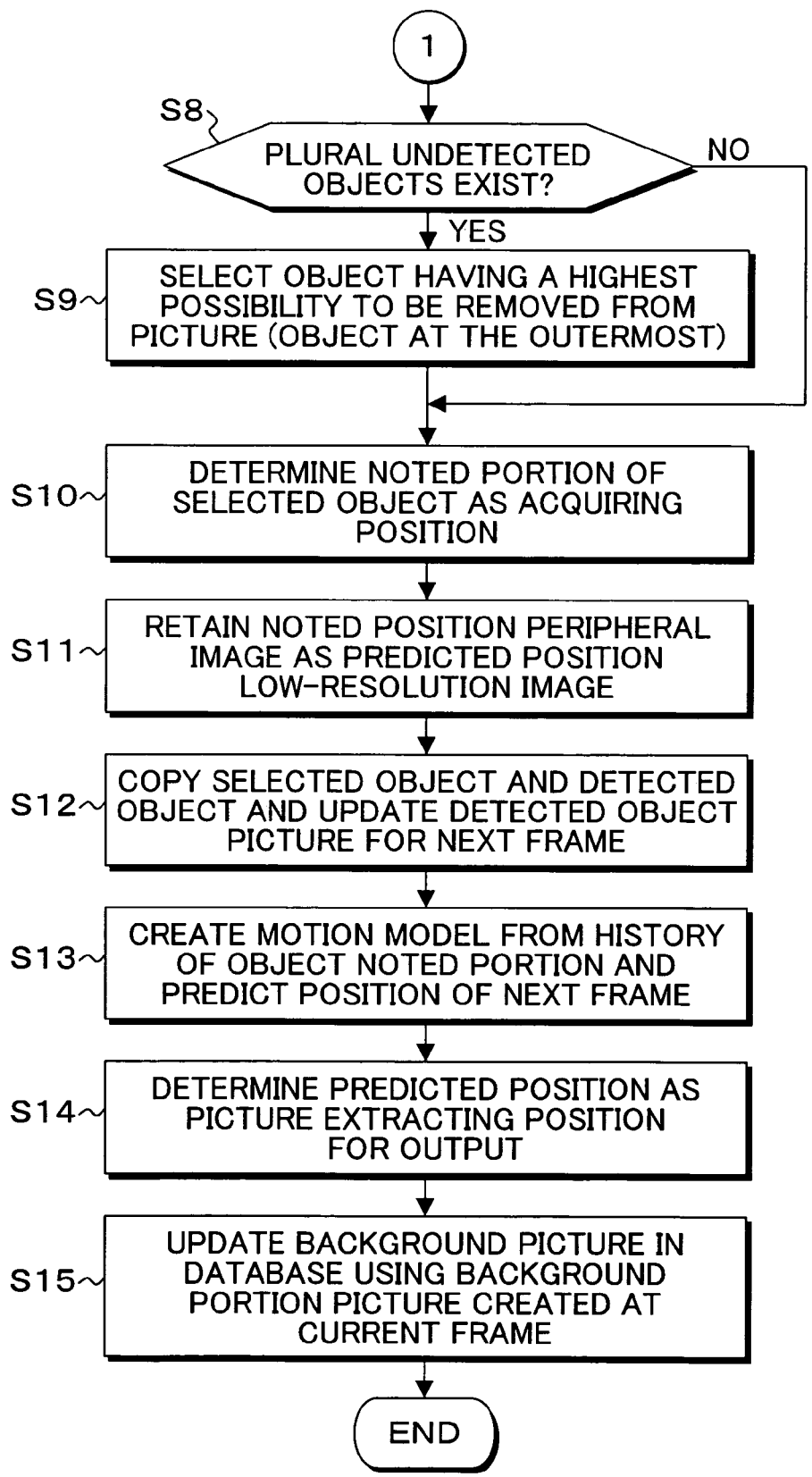

FIGS. 19A and 19B are flowcharts of the procedure of the image processing in FIG. 18. In FIGS. 19A and 19B, the processes of steps S1 to S5 are the same as those of the flowchart of FIGS. 16A and 16B, but at step S6 which follows, false prediction detection processing is newly provided.

Steps S7 to S10 which follow are the same as processes of the steps S6 to S9 of FIGS. 16A and 16B, but differs therefrom in that the low-resolution picture in the vicinity of the noted position selected at step S10 is selected for the false prediction detection in the next frame. The remaining steps S12 to S15 are the same as the processes of the steps S10 to S13 of FIGS. 16A and 16B.

Figure 20:
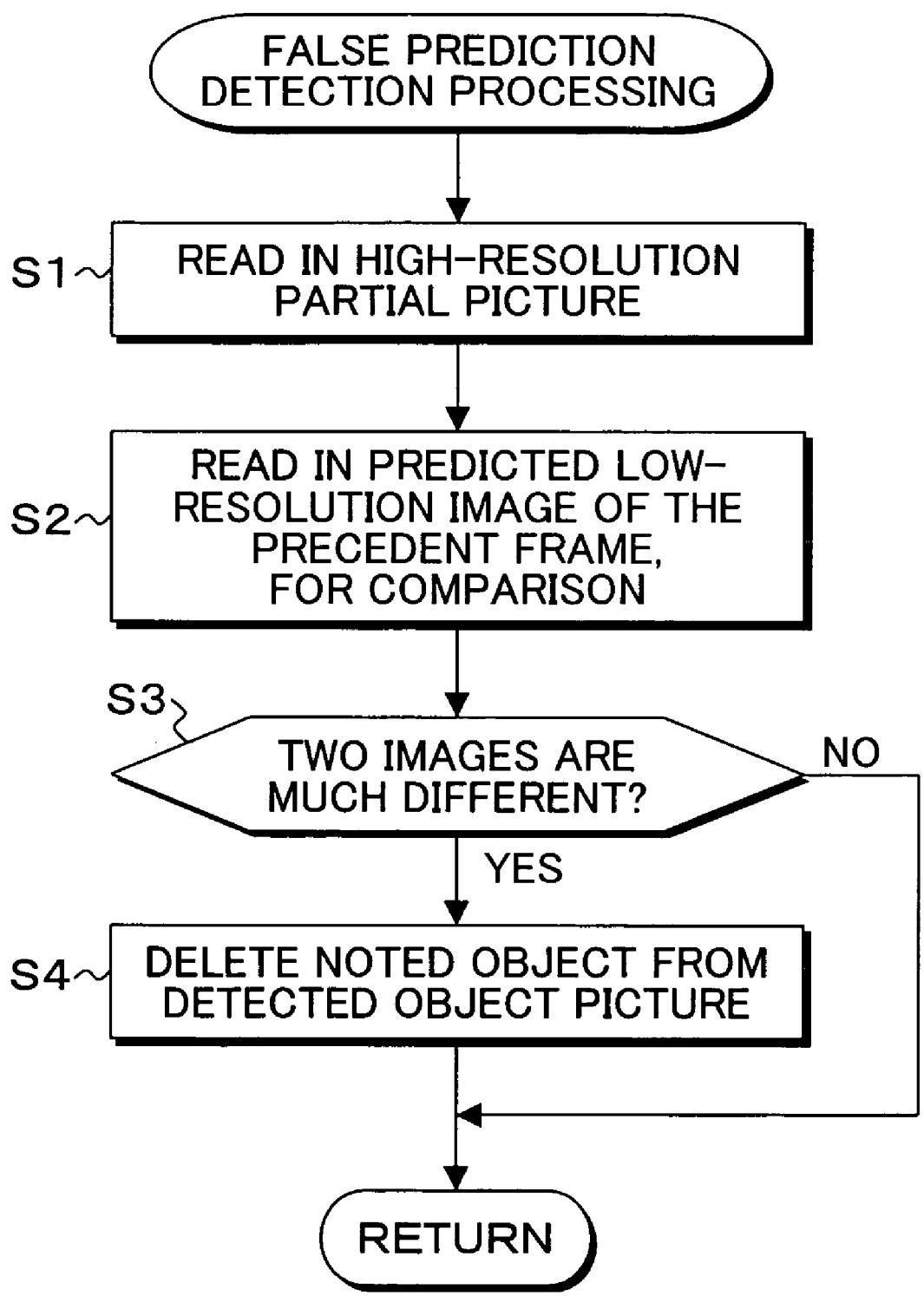
FIG. 20 is a flowchart of prediction failure detection processing of FIGS. 19A and 19B.

FIG. 20 is a flowchart of the detailed procedure of the false prediction detection processing of step S6 in FIGS. 19A and 19B. In FIG. 20, the false prediction detection processing includes reading in a high-resolution partial picture at step S1 and reading for comparison predicted low-resolution picture data in the vicinity of the noted position prior to the prediction of the position by the motion capacity retained in the previous frame at step S2.

If it is judged at step S3 as a result of this comparison that the degree of matching between the two becomes equal to or less than a predetermined threshold value, resulting in a great difference, then the noted object in the previous frame is deleted from the detected object picture at step S4, after which the procedure returns to step S7 in which in the following processings, the extracting position is again determined of the noted object in the previous frame such that a high-resolution partial picture can be acquired.

FIGS. 21A and 21B are block diagrams of another embodiment of the present invention enabling any image processing to be performed by transferring to an external image processor the low-resolution whole picture and the high-resolution partial picture obtained by the image inputting processing of the present invention.

In FIGS. 21A and 21B, a picture transmission unit 146 is provided for the picture inputting apparatus 100 of the present invention shown in the embodiment of FIG. 1 or FIG. 17. The picture transmission unit 146 includes a D/A converter 156 for converting low-resolution whole picture data output from the picture inputting apparatus 100 into an analog picture signal such as NTSC, for example, and a picture transmitter 158 for transmitting the thus obtained analog picture signal to a transmission line 145.

The picture transmission unit 146 further includes a D/A converter 160 for converting high-resolution partial picture data into an analog picture signal such as NTSC, and a picture transmitter 162 for transmitting the thus obtained analog signal to the transmission line 145.

An image processor 150 disposed at a remote external position is connected via a picture receiving unit 148 to the transmission line 145 from the picture inputting apparatus 100. The picture receiving unit 148 is provided with picture receivers 164 and 168, and A/D converters 166 and 170.

The picture receiver 164 receives an analog picture signal of a low-resolution whole picture transmitted via the transmission line 145 from the picture inputting apparatus 100 and converts the analog picture signal by the A/D converter 166 into digital data for the input to the image processor 150. The picture receiver 168 receives an analog picture signal of a high-resolution partial picture transmitted via the transmission line 145 from the picture inputting apparatus 100 and converts the analog picture signal by the A/D converter 170 into digital data for the input to the image processor 150.

This enables the image processor 150 to receive at a frame rate not less than the video rate of 30 fsp a low-resolution whole picture and a high-resolution partial picture acquired by the picture inputting apparatus of the present invention and to execute in a distributed manner the functions of, e.g., performing specific recognition processing of the detailed picture obtained as the high-resolution partial picture using the low-resolution whole picture and the high-resolution partial picture of the noted point acquired by automatic tracking of the picture inputting apparatus 100 of the present invention.

The picture inputting apparatus 100 is associated with a data transmission unit 152 which includes a data transmitter 172 and a data receiver 174. Correspondingly, the external image processor 150 is also associated with a data transmission unit 154 which includes a data receiver 176 and a data transmitter 178.

The data transmitter 172 and the data receiver 174 transmit via the transmission line 145 to the external image processor 150 the positional information on the extracting position of the high-resolution partial picture determined by the image processing unit 32 of FIG. 1 or the image processing unit 32-1 of FIG. 13 disposed on the picture inputting apparatus 100.

The data transmitter 178 and the data receiver 176 transmit instructive information on the extracting position of the high-resolution partial picture from the external image processor 150 via the transmission line 145 to the image inputting apparatus 100 of the present invention, to thereby impart an external instruction to the picture inputting apparatus 100.

According to the embodiment of FIGS. 21A and 21B, it is possible to perform any recognition processing using two pictures in a function isolated manner by transmitting the whole picture and the partial picture from the picture inputting apparatus of the present invention 100 to the external image processor 150. Depending on the complexity of the image processing, it is possible to share the processing by the picture inputting apparatus 100 of the present invention and by a single or a plurality of external image processor(s), and to constitute an image processing system having any scale in conformity with the complicated processing.

Since the picture information transmitted from the picture inputting apparatus 100 to the image processor 150 is converted into an analog signal for transmission, it is possible to extend the transmission distance therebetween and to constitute a system in a distributed environment where their respective image processors are placed at positionally remote sites.

FIG. 22 shows another embodiment of a solid state image pickup device used in the embodiment of FIG. 1 or FIG. 13. This embodiment is characterized in that the low-resolution whole picture is created through thinning-out processing of the pixel array.

In FIG. 22, similar to the embodiment of FIG. 2, a pixel array 10-1 consists of a plurality of execution cells in $N_1 \times N_2$ matrix of pixels arranged at a high density. All the filters are removed which have been provided for each group cell of $m_1 \times m_2$ in matrix in order to obtain the low-resolution pixel value in the embodiment of FIG. 2, and correspondingly the structure of the photo-receptive cell shown in FIG. 23 is employed.

Figure 23:
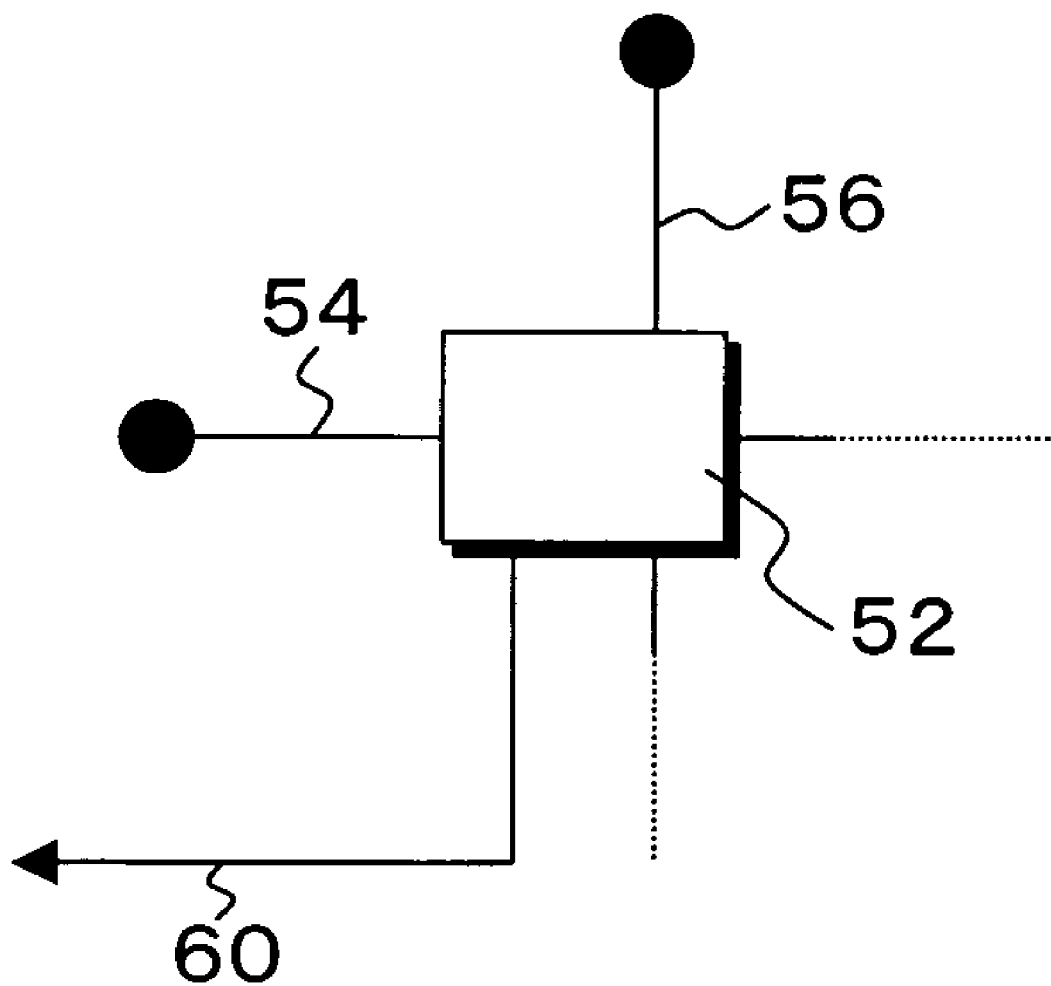
FIG. 23 is an explanatory diagram of a photo-receptive cell disposed in a pixel array of FIG. 22.

In the structure of the photo-receptive cell of FIG. 23, the photo-receptive cell 52 is associated with a row selection line 54 and a column selection line 56, with only a single output line 60 extending from the photo-receptive cell 52 for the individual pixel output.

The low-resolution whole picture scanning unit 14 of FIG. 1 and FIG. 13 for effecting readout scanning of a low-resolution whole picture on such a solid state image pickup device 10-1 performs address designation for the row selection circuit 36 with a row addressing signal 44 every $n_1$ pixels and performs address designation for the column selection circuit 38 resulting in column direction with a column addressing signal 46 every $n_2$ pixels, to thereby enable $m_1 \times m_2$ pixels of low-resolution whole picture to be read out from the matrix of $N_1 \times N_2$ pixels.

The thinning-out processing of this embodiment has a strong possibility to cause aliasing in which the picture high-frequency components create false information in the low-resolution pictures. Therefore, by limiting the target of observation by use of the solid state image pickup device 10-1 of this embodiment to the observation target whose whole picture has a relatively low spatial frequency, it is possible to suppress the aliasing problem in the low-resolution image arising from the pixel thinning-out processing.

Although the above description of the embodiments has been made mainly of the functions of the picture inputting apparatus intended for the image processing, it is natural that the image inputting apparatus of the present invention could be used as a picture sensor for monitoring and applied to a monitoring system in which a low-resolution whole picture in the form of a time-varying image capable of being acquired at a rate equal to or higher than the video rate and a high-resolution partial picture obtained by automatic determination of a noted portion are displayed separately on a monitor such that a person can directly monitor them.

The present invention could be applied to a system in which the low-resolution whole picture and the high-resolution partial picture obtained in the present invention are directly transmitted by a video transmission system having a VTR or a hard disk.

The pixel sizes of low resolution and high resolution in the above embodiments are merely relative ones, and hence the relationship between the low resolution and the high resolution could be established by an appropriate standard if necessary.

Although the above embodiments employ for output the same pixel size of the low-resolution whole picture and high-resolution partial picture acquired by the picture inputting apparatus of the present invention, the pixel size of the high-resolution partial picture could be further enlarged insofar as its rate does not fall below the video rate of 30 fps, or alternatively it could be a smaller size than the pixel size of the low-resolution whole picture.

The present invention is not limited to the above embodiments but includes any variants without impairing its objects and advantages. Furthermore, the present invention is not restricted by numerical values indicated in the above embodiments.

As set forth hereinabove, according to the present invention, the whole scene to be observed can be acquired as a low-resolution whole picture, with only the partial noted points therewithin being acquired in the form of detailed pictures as high-resolution partial pictures. In cases where for example the low-resolution whole picture and the high-resolution partial picture have the same size, even though the resolution of the high-resolution partial pictures is extremely high, the total amount of information of the two pictures can be the amount of information for two low-resolution whole pictures, whereby the low-resolution whole picture and the high-resolution partial picture (detailed picture) can be acquired at the same time and at a frame rate equal to or greater than the video rate.

The picture inputting apparatus of the present invention enables noted portions acquired as detailed pictures in the form of high-resolution partial pictures to automatically and rapidly selectively be determined depending on the contents of the low-resolution whole picture through the execution of any image processing program in the image processing unit included in the apparatus.

With the scene being an object to be processed where the object moves or varies with time, use of this function enables both the image processing in which quite different points in the whole shooting region are determined as positions acquiring high-resolution information for each frame depending on the variance with time and the shooting of the high-resolution pictures at the quite different shooting positions for each frame through this selection.

Satisfactory images for image processing using the low-resolution whole pictures can be obtained without the picture high-frequency components causing any aliasing which may generate fault information in the low-resolution pictures, since low-resolution pictures are generated through the local averaging processing in which for the pixel array of the solid state image pickup device having a high-density pixel arrangement, a filter is provided for each set of pixels segmented into a matrix pixel count for the generation of a low-resolution picture, so-call for each group cell to output as a new pixel value the sum total or the mean values of a plurality of pixel values.

What is claimed is:

1. A picture inputting apparatus comprising:
a solid state image pickup device having a high-resolution pixel array consisting of a plurality of photo-receptive elements disposed at a high density for converting a formed image into a pixel value of an electric signal by photoelectric conversion;
a low-resolution whole picture scanning unit which outputs low-resolution whole picture data by reading out and scanning the wholeness of an imaging range with the pixel array resolution lowered;
a high-resolution partial picture scanning unit which outputs high-resolution partial picture data by partially reading out and scanning the imaging range with the pixel array high-resolution kept;
a switching unit which provides a switching between the low-resolution whole picture scanning unit and the high-resolution partial picture scanning unit within a predetermined frame period of picture signals to thereby output in sequence the low-resolution whole picture data and the high-resolution partial image data at a speed equal to or greater than the video rate;
an image processing unit which automatically determines the extracting position of the high-resolution partial picture at the next frame, based on the low-resolution whole picture data output from the low-resolution whole picture scanning unit, to thereby instruct the high-resolution partial picture scanning unit on the extracting position; and
a picture transmission unit which converts into analog picture signals low-resolution whole picture data output from the low-resolution whole picture scanning unit and high-resolution partial picture data output from the high-resolution partial picture scanning unit, to transmit the obtained analog picture signals to an external image processor via a transmission path, wherein
the picture transmission unit converts the low-resolution whole picture data and the high-resolution partial picture data into analog picture signals, respectively, for parallel transmission along parallel paths.

2. The picture inputting apparatus according to claim 1, further comprising:
a low-resolution whole picture accumulation unit which accumulates the low-resolution whole picture data output as a result of readout scanning of the pixel array;
a whole picture data transmission unit which reads out images accumulated in the low-resolution whole picture accumulation unit to shape the low-resolution whole picture data into a single piece of picture data in a predetermined format, for the output to the outside;
a high-resolution partial picture accumulation unit which accumulates the high-resolution partial picture data output as a result of the readout scanning of the pixel array; and
a partial picture data transmission unit which reads out images accumulated in the high-resolution partial picture accumulation unit to shape the high-resolution partial picture data into a single piece of picture data in a predetermined format, for the output to the outside.

3. The picture inputting apparatus according to claim 1, wherein
the solid state image pickup device includes:
a plurality of photo-receptive elements which are two-dimensionally arranged in N1 rows and N2 columns;
a column selection line and a row selection line which select individually the plurality of photo-receptive elements to allow output of a pixel value;
two output lines disposed at each of the plurality of photo-receptive elements; and
a plurality of filters which calculate and output the sum or the mean value by connecting to their respective inputs one output lines of the photo-receptive elements on an n1 rows and n2 columns pixel basis where n1 and n2 are integers obtained by dividing high-resolution N1 rows and N2 columns by low-resolution m1 rows and m2 columns, respectively, where the pixel count of the N1 rows and N2 columns provides a high-resolution picture while the pixel count of m1 rows and m2 columns less than the pixel count of the N1 rows and N2 columns provides a low-resolution picture,
wherein
the low-resolution whole picture scanning unit collectively selects the photo-receptive elements for each n1 rows and n2 columns for each of the plurality of filters and simultaneously allows filter outputs of m1 rows and m2 columns to be output in the form of low-resolution whole picture signals, and wherein the high-resolution partial picture scanning unit scans the photo-receptive elements in k1 rows and k2 columns which are designated as the extracting position within the N1 rows and N2 columns to allow pixel values to be output as high-resolution partial picture signals from the other output lines.

4. The picture inputting apparatus according to claim 1, wherein the solid state image pickup device includes:
a plurality of photo-receptive elements which are two-dimensionally arranged in N1 rows and N2 columns; and a column selection line and a row selection line which select individually the plurality of photo-receptive elements to allow output of a pixel value, wherein the low-resolution whole picture scanning unit allows output of low-resolution whole picture signals while thinning out pixel values for each n1 rows and n2 columns where n1 and n2 are integers obtained respectively by dividing high-resolution n1 rows and n2 columns respectively by low-resolution m1 rows and m2 columns, where the pixel count of the N1 rows and N2 columns provides a high-resolution picture while the pixel count of m1 rows and m2 columns less than the pixel count of the N1 rows and N2 columns provides a low-resolution picture, and wherein the high-resolution partial picture scanning unit scans the photo-receptive elements in k1 rows and k2 columns which are designated as the extracting position within the N1 rows and N2 columns to allow pixel values to be output as high-resolution partial picture signals.

5. The picture inputting apparatus according to claim 3, wherein
the low-resolution whole picture scanning unit and the high-resolution partial picture scanning unit perform readout scanning such that the low-resolution whole picture and the high-resolution partial picture have the same pixel size.

6. The picture inputting apparatus according to claim 3, wherein
the low-resolution whole picture scanning unit and the high-resolution partial picture scanning unit perform readout scanning such that the low-resolution whole picture and the high-resolution partial picture have the same pixel size which is expressed by a matrix of 512× 480 pixels in NTSC, 768×576 pixels in PAL or 640×480 pixels in VGA.

7. A picture inputting apparatus comprising:
a solid state image pickup device having a high-resolution pixel array consisting of a plurality of photo-receptive elements disposed at a high density for converting a formed image into a pixel value of an electric signal by photoelectric conversion;
a low-resolution whole picture scanning unit which outputs low-resolution whole picture data by reading out and scanning the wholeness of an imaging range with the pixel array resolution lowered;
a high-resolution partial picture scanning unit which outputs high-resolution partial picture data by partially reading out and scanning the imaging range with the pixel array high-resolution kept;
a switching unit which provides a switching between the low-resolution whole picture scanning unit and the high-resolution partial picture scanning unit within a predetermined frame period to thereby output in sequence the low-resolution whole picture data and the high-resolution partial image data at a speed equal to or greater than the video rate; and
an image processing unit which automatically determines the extracting position of the high-resolution partial picture at the next frame, based on the low-resolution whole picture data output from the low-resolution whole picture scanning unit, to thereby instruct the high-resolution partial picture scanning unit on the extracting position, wherein
the image processing unit includes:
an object region extraction unit which extracts a changed object region and an unchanged non-object region based on the difference of pixels between low-resolution whole picture data of the current frame and background picture data of the last frame;
a background picture updating unit which adds the unchanged non-object region to the background picture data, for updating;
a noted position detection unit which selects an undetected noted object through the comparison of the object region data with detected object data of the last frame, to determine a noted position, the noted position detection unit adding the selected noted object to the detected object data, for updating; and
an extracting position determination unit which predicts a noted position of the next frame based on a motion model obtained from the frame history of the noted position of the selected noted object, to determine a picture extracting position of the next frame.

8. The picture inputting apparatus according to claim 1, wherein
the image processing unit automatically determines the extracting position of a high-resolution picture at the next frame based on the high-resolution partial picture data in addition to the low-resolution whole picture data and instructs the high-resolution partial picture scanning unit on the determined extracting position.

9. A picture inputting apparatus comprising:
a solid state image pickup device having a high-resolution pixel array consisting of a plurality of photo-receptive elements disposed at a high density for converting a formed image into a pixel value of an electric signal by photoelectric conversion;
a low-resolution whole picture scanning unit which outputs low-resolution whole picture data by reading out and scanning the wholeness of an imaging range with the pixel array resolution lowered;
a high-resolution partial picture scanning unit which outputs high-resolution partial picture data by partially reading out and scanning the imaging range with the pixel array high-resolution kept;
a switching unit which provides a switching between the low-resolution whole picture scanning unit and the high-resolution partial picture scanning unit within a predetermined frame period to thereby output in sequence the low-resolution whole picture data and the high-resolution partial image data at a speed equal to or greater than the video rate; and
an image processing unit which automatically determines the extracting position of the high-resolution partial picture at the next frame, based on the low-resolution whole picture data output from the low-resolution whole picture scanning unit, to thereby instruct the high-resolution partial picture scanning unit on the extracting position, wherein
the solid state image pickup device includes:
a plurality of photo-receptive elements which are two-dimensionally arranged in N1 rows and N2 columns:
a column selection line and a row selection line which select individually the plurality of photo-receptive elements to allow output of a pixel value;
two output lines disposed at each of the plurality of photo-receptive elements; and
a plurality of filters which calculate and output the sum or the mean value by connecting to their respective inputs one output lines of the photo-receptive elements on an n1 rows and n2 columns pixel basis where n1 and n2 are integers obtained by dividing high-resolution N1 rows and N2 columns by low-resolution m1 rows and m2 columns, respectively, where the pixel count of the N1 rows and N2 columns provides a high-resolution picture while the pixel count of m1 rows and m2 columns less than the pixel count of the N1 rows and N2 columns provides a low-resolution picture, wherein the low-resolution whole picture scanning unit collectively selects the photo-receptive elements for each n1 rows and n2 columns for each of the plurality of filters and simultaneously allows filter outputs of m1 rows and m2 columns to be output in the form of low-resolution whole picture signals, and wherein the high-resolution partial picture scanning unit scans the photo-receptive elements in k1 rows and k2 columns which are designated as the extracting position within the N1 rows and N2 columns to allow pixel values to be output as high-resolution partial picture signals from the other output lines, wherein the low-resolution whole picture scanning unit and the high-resolution partial picture scanning unit perform readout scanning such that the low-resolution whole picture and the high-resolution partial picture have the same pixel size which is expressed by a matrix of 512×480 pixels in NTSC, 768×576 pixels in PAL or 640×480 pixels in VGA, wherein the image processing unit includes:

an object region extraction unit which extracts a changed object region and an unchanged non-object region based on the difference of pixels between low-resolution whole picture data of the current frame and background picture data of the last frame;

a background picture updating unit which adds the unchanged non-object region to the background picture data, for updating;

a prediction failure detection unit which compares high-resolution partial picture data acquired at the current frame with low-resolution whole picture data at the extracting position accumulated in the last frame, the prediction failure detection unit if the two pictures differs from each other, removing the noted object from the detected object picture of the last frame;

a noted position detection unit which selects an undetected noted object through the comparison of the object region data with the detected object picture data, to determine a noted position, the noted position detection unit adding the selected object to the detected object picture data, for updating; and an extracting position determination unit which predicts a noted position of the next frame based on a motion model obtained from the frame history of the selected noted object, to determine the extracting position of the next frame.

10. The picture inputting apparatus according to claim 1, wherein the image processing unit determines the extracting position of a high-resolution partial picture based on the execution of an image processing program externally loaded and retained or on an external instruction.

\* \* \* \* \*

UNITED STATES PATENT AND TRADEMARK OFFICE
CERTIFICATE OF CORRECTION

PATENT NO. : 7,551,203 B2
APPLICATION NO. : 10/722586
DATED : June 23, 2009
INVENTOR(S) : Osafumi Nakayama et al.

It is certified that error appears in the above-identified patent and that said Letters Patent is hereby corrected as shown below:

Column 24, Lines 55-61, change
"whole picture signals, and wherein the high-resolution partial picture scanning unit scans the photo-receptive elements in k1 rows and k2 columns which are designated as the extracting position within the N1 rows and N2 columns to allow pixel values to be output as high-resolution partial picture signals from the other output lines." to
-- whole picture signals, and wherein the high-resolution partial picture scanning unit scans the photo-receptive elements in k1 rows and k2 columns which are designated as the extracting position within the N1 rows and N2 columns to allow pixel values to be output as high-resolution partial picture signals from the other output lines.--.

Column 25, Line 8, change "n1" to --N1--.

Column 25, Line 8, change "n2" to --N2--.

Column 26, Line 55, change "columns:" to --columns;--.

Signed and Sealed this

Thirteenth Day of October, 2009

David J. Kappos
*Director of the United States Patent and Trademark Office*